(12) United States Patent
Sepczuk

(10) Patent No.: US 10,852,904 B2
(45) Date of Patent: Dec. 1, 2020

(54) APPARATUS AND METHOD FOR PROVIDING ADAPTIVE USER INTERFACE

(71) Applicant: Samsung Electronics Co., Ltd, Suwon-si (KR)

(72) Inventor: Damian Miroslaw Sepczuk, Warsaw (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/477,851

(22) PCT Filed: Jan. 12, 2018

(86) PCT No.: PCT/KR2018/000610
§ 371 (c)(1),
(2) Date: Jul. 12, 2019

(87) PCT Pub. No.: WO2018/131928
PCT Pub. Date: Jul. 19, 2018

(65) Prior Publication Data
US 2019/0361588 A1 Nov. 28, 2019

(30) Foreign Application Priority Data
Jan. 12, 2017 (KR) .......................... 10-2017-0005430

(51) Int. Cl.
*G06F 3/0481* (2013.01)
*G06F 9/451* (2018.01)
(Continued)

(52) U.S. Cl.
CPC ...... *G06F 3/04812* (2013.01); *G06F 3/04847* (2013.01); *G06F 3/04886* (2013.01); *G06F 9/451* (2018.02)

(58) Field of Classification Search
CPC ........................... G06F 3/04812; G06F 3/0481
(Continued)

(56) References Cited

U.S. PATENT DOCUMENTS 7,401,300 B2 7/2008 Nurmi
8,305,433 B2 * 11/2012 Alberth ................... G06F 3/011
348/77

(Continued)

FOREIGN PATENT DOCUMENTS

EP 2482171 A1 8/2012
KR 10-2013-0065317 A 6/2013
(Continued)

OTHER PUBLICATIONS

European Patent Office, "Supplementary Partial European Search Report," Application No. EP 18738701.4, Sep. 20, 2019, 17 pages.
(Continued)

*Primary Examiner* — William D Titcomb

(57) ABSTRACT

Various embodiments of the present invention relates to an electronic device and a method for providing a user interface (UI). The electronic device for providing a UI comprises: a display for displaying a UI; and a processor connected to the display, wherein the processor is configured to: display a UI including an object, having a first size, for executing at least one function of an application which is executed by the electronic device; detect an moment of the electronic device on the basis of data acquired through a sensor of the electronic device; and display a UI including the object, the size of which is changed from the first size in the UI to a second size, on the basis of the detected movement and information indicating the frequency of user inputs detected from the object.

15 Claims, 20 Drawing Sheets

(51) Int. Cl.
*G06F 3/0484* (2013.01)
*G06F 3/0488* (2013.01)

(58) Field of Classification Search
USPC .......................................................... 715/718
See application file for complete search history.

(56) References Cited

U.S. PATENT DOCUMENTS

| | | | |
|---|---|---|---|
| 9,367,129 B1 | 6/2016 | Manjunatha et al. | |
| 9,536,197 B1* | 1/2017 | Penilla .................... | B60L 58/12 |
| 2007/0277111 A1* | 11/2007 | Bennett ............... | G06F 3/04812 |
| | | | 715/763 |
| 2008/0074384 A1* | 3/2008 | Orr ....................... | G06F 1/1626 |
| | | | 345/156 |
| 2010/0146444 A1 | 6/2010 | Wang et al. | |
| 2011/0148808 A1* | 6/2011 | Sakurai .................. | G06F 3/045 |
| | | | 345/174 |
| 2011/0149059 A1* | 6/2011 | Alberth ................ | G09B 21/008 |
| | | | 348/77 |
| 2012/0106837 A1* | 5/2012 | Partis .................... | G06K 9/3241 |
| | | | 382/165 |
| 2013/0152017 A1* | 6/2013 | Song ..................... | G06F 3/0482 |
| | | | 715/811 |
| 2013/0234929 A1 | 9/2013 | Libin | |
| 2015/0089360 A1 | 3/2015 | Brisebois | |
| 2015/0199020 A1* | 7/2015 | Hatada ................. | G06F 3/04812 |
| | | | 345/158 |
| 2016/0080438 A1* | 3/2016 | Liang .................. | G06F 3/04812 |
| | | | 715/753 |
| 2016/0147429 A1 | 5/2016 | Byun | |
| 2016/0253064 A1* | 9/2016 | Hattori ................ | H04M 1/0281 |
| | | | 715/716 |
| 2017/0083204 A1* | 3/2017 | Kim ..................... | G06F 3/04812 |
| 2018/0181293 A1* | 6/2018 | Dare .................... | G06F 3/04812 |

FOREIGN PATENT DOCUMENTS

| | | |
|---|---|---|
| KR | 10-1367060 B1 | 2/2014 |
| KR | 10-2016-0060386 A | 5/2016 |
| WO | 2015/044830 A1 | 4/2015 |

OTHER PUBLICATIONS

International Search Report dated Apr. 26, 2018 in connection with International Patent Application No. PCT/KR2018/000610, 2 pages.
Written Opinion of the International Searching Authority dated Apr. 26, 2018 in connection with International Patent Application No. PCT/KR2018/000610, 6 pages.
Supplementary European Search Report dated Jan. 20, 2020 in connection with European Patent Application No. 18 73 8701, 21 pages.

* cited by examiner

APPARATUS AND METHOD FOR PROVIDING ADAPTIVE USER INTERFACE

CROSS-REFERENCE TO RELATED APPLICATIONS

This application is a 371 of International Application No. PCT/KR2018/000610 filed on Jan. 12, 2018, which claims priority to Korean Patent Application No. 10-2017-0005430 filed on Jan. 12, 2017, the disclosures of which are herein incorporated by reference in their entirety.

BACKGROUND

1. Field

The disclosure relates to an electronic device and, more particularly, to a method and apparatus for adaptively providing a user interface (UI) according to a user state.

2. Description of Related Art

Electronic devices such as laptop computers, tablet PCs, ultra-mobile PCs, smart phones, and the like provide improved mobility and convenience for users. Electronic devices are required to provide improved user interfaces (UI) suitable for the situation where users are in. For example, when a user is moving, when the sensitivity of a touch input decreases due to wintry weather, when a user wears gloves, when the eyesight of a user is poor, or when a user has difficulty in correctly inputting a touch input due to a certain disease, the user may incorrectly select a button among displayed input buttons which is improper for the intention of the user. Therefore, electronic devices are required to adaptively provide UIs depending on the state of the user.

Therefore, the disclosure has been made in view of the above-mentioned problems, and an aspect of the disclosure is to provide a method and apparatus for adaptively providing a user interface (UI) depending on the state of a user.

SUMMARY

In accordance with an aspect of the disclosure, an operation method of an electronic device is provided. The operation method may include: displaying a user interface (UI) including an object which has a first size and is used for executing at least one function of an application running in the electronic device; detecting movement of the electronic device on the basis of data obtained via a sensor of the electronic device; and displaying, in the UI, the object of which a size is changed from the first size to a second size on the basis of the detected movement and information indicating an input frequency of a user input detected from the object.

In accordance with an aspect of the disclosure, an electronic device is provided. The electronic device may include: a display configured to display a user interface (UI); and a processor coupled with the display, wherein the processor is configured to: display, in the UI, an object which has a first size and is used for executing at least one function of an application running in the electronic device; detect movement of the electronic device on the basis of data obtained via a sensor of the electronic device; and display, in the UI, the object of which the size is changed from the first size to a second size, on the basis of the detected movement and information indicating an input frequency of a user input detected from the object.

According to various embodiments, there are provided an electronic device and a method therefor, which display an object that is changed on the basis of information stored in advance and the detected movement of the electronic device, so as to improve the accuracy of a touch input by a user.

Effects which can be acquired by the disclosure are not limited to the above described effects, and other effects that have not been mentioned may be clearly understood by those skilled in the art from the following description.

DETAILED DESCRIPTION

Figure 1:
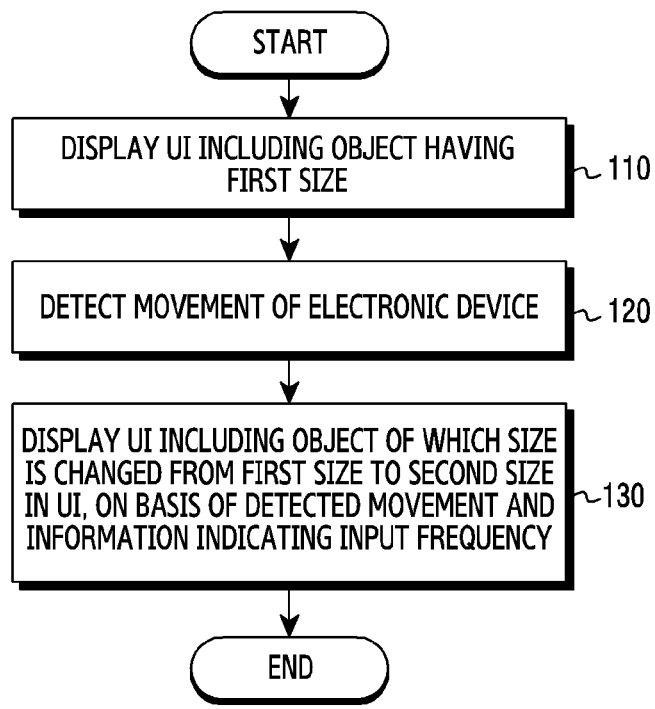
FIG. 1 is a flowchart illustrating an operation of providing, by an electronic device, a user interface (UI) according to various embodiments.

Hereinafter, various embodiments of the disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context.

As used herein, the expression "A or B" or "at least one of A and/or B" may include all possible combinations of items enumerated together. The expression "a first", "a second", "the first", or "the second" may modify various components regardless of the order and/or the importance, and is used merely to distinguish one element from any other element without limiting the corresponding elements. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to one embodiment of the disclosure is not limited to the above described devices. In the disclosure, the term "user" may indicate a person using an electronic device or a device (e.g., an artificial intelligence electronic device) using an electronic device.

In the disclosure, an object is displayed by a display, and may include an image, text, and the like which may detect a user input. For example, the object may be an icon displayed on a background screen, a play button, a pause button, a stop button displayed by a music application, and/or a keyboard input button, and the like.

A user who uses an electronic device may abnormally select an object displayed on a display of the electronic device due to a certain user state. For example, when the user uses the electronic device while moving, the user may inaccurately select an object displayed on the display. As another example, when the user wears gloves, when the eyesight of the user is poor, when the sensitivity of an input detection sensor included in the display of the electronic device decreases due to wintry weather, or when the user suffers from a certain disease, the user may inaccurately select the displayed object.

In the description provided below, there are provided an electronic device and an operation method therefor, which may provide a user interface (UI) improved to be suitable for the state of the user.

FIG. 1 is a flowchart illustrating an operation of providing, by an electronic device, a user interface (UI) according to various embodiments. For ease of description, although FIG. 1 illustrates that the operations are implemented by an electronic device, each of the operations may be implemented by a component included in the electronic device. For example, each of the operations may be executed by at least one processor included in the electronic device. Also, each of the operations may be a set of instructions or an application programming interface (API) stored in a memory of the electronic device. Also, some of the operations may be omitted or added depending on a method of implementing each of the operations illustrated in FIG. 1, and the same operation may be repeatedly performed.

Referring to FIG. 1, in operation 110, the electronic device may display a UI including an object, which has a first size and is to be used to execute at least one function of an application that runs in the electronic device. In the disclosure, the first size indicates a size set in advance by an application (a default size). Depending on implementation, a plurality of objects may be used. For example, when a music application runs in the electronic device, the object may be an album image of a certain artist, a play button, a pause button, a stop button, a rewind button, a fast-forward button, a repeat button, a random button, and the like.

In operation 120, the electronic device may detect the movement of the electronic device on the basis of data obtained via a sensor of the electronic device. A method of detecting the movement of the electronic device may vary depending on implementation. For example, the electronic device may detect the movement of the electronic device using one or more from among a global positioning system (GPS) or geo-magnetic sensor, a gravity sensor, an acceleration sensor, and a gyro sensor. As another example, when the electronic device enters a vehicle, the electronic device may communicate with a beacon device or a vehicle system installed in the vehicle, thereby detecting that the electronic device enters the vehicle.

In operation 130, the electronic device may display a UI including an object of which the size is changed from the first size to a second size on the basis of the detected movement of the electronic device and information indicating an input frequency. In the disclosure, the second size indicates a size different from the first size, and the second size may be determined by one of the various methods. According to an embodiment, the second size may be a size based on a rate set in advance by the electronic device (a default rate). According to another embodiment, the second size may be determined to be different depending on the level of an input frequency value of the object which is classified according to a predetermined criterion. For example, when the level corresponding to the input frequency value of the object is level 1, the electronic device may enlarge the size of the object by a rate corresponding to level 1. As another example, when the input frequency value of the object is greater than the input frequency value corresponding to level 1 (i.e., level 2), the electronic device may enlarge the size of the object by a rate corresponding to level 2 (i.e., a rate higher than the rate corresponding to level 1).

As another example, the second size may be determined on the basis of information associated with an incorrect input. For example, when the electronic device detects that the user of the electronic device does not normally provide an input to the object and provide an input to an upper portion of the object frequently, the electronic device may enlarge the size of the object in the vertical direction.

The information indicating the frequency of an input may vary depending on implementation. According to an embodiment, the information indicating the frequency of an input may be heatmap information indicating the input frequency of a user input detected within a region of the object. A heatmap may be information representing frequencies of occurrence of events (detected user inputs) that occur within a predetermined region in different colors. The electronic device may recognize an object to which the user of the electronic device frequently provides an input, using heatmap information generated on the basis of the frequency value of a user input detected during a predetermined period of time.

According to another embodiment, the information indicating the frequency of an input may be the frequency value of a user input detected beyond the region of the object. For example, when a music application runs in the electronic device, the user may abnormally provide an input to a play button displayed by the electronic device, but provide an input to a region beyond the play button, while walking. The electronic device may recognize a pattern of an incorrect input provided by the user of the electronic device, using heatmap information generated according to the frequency value of a user input (in the disclosure, a user input detected beyond the region of the object is referred to as an incorrect input) detected beyond the region of the object during a predetermined period of time.

The electronic device may update information stored in advance, in addition to the information indicating the frequency of an input to the object. As an example, the information stored in advance may be size enlargement information set in advance in the electronic device. In other words, when the movement of the electronic device is detected, the electronic device may display a UI in which an object is enlarged (or reduced) from the first size to the second size according to a rate set in advance in the electronic device. According to another embodiment, the information stored in advance may include one or more from among information associated with the age, gender, eyesight, a medical history, and the like. For example, when the eyesight of the user is less than a predetermined reference value (e.g., an eyesight of 0.1) and the user may not recognize an object displayed in the electronic device, or when the user abnormally provides an input to a displayed object due to a certain disease (e.g., Parkinson disease), the electronic device may display a UI including an object of which the size is changed from the first size to the second size. The information stored in advance may be updated by a predetermined period (e.g., every day, every week, or every month).

Figure 2:
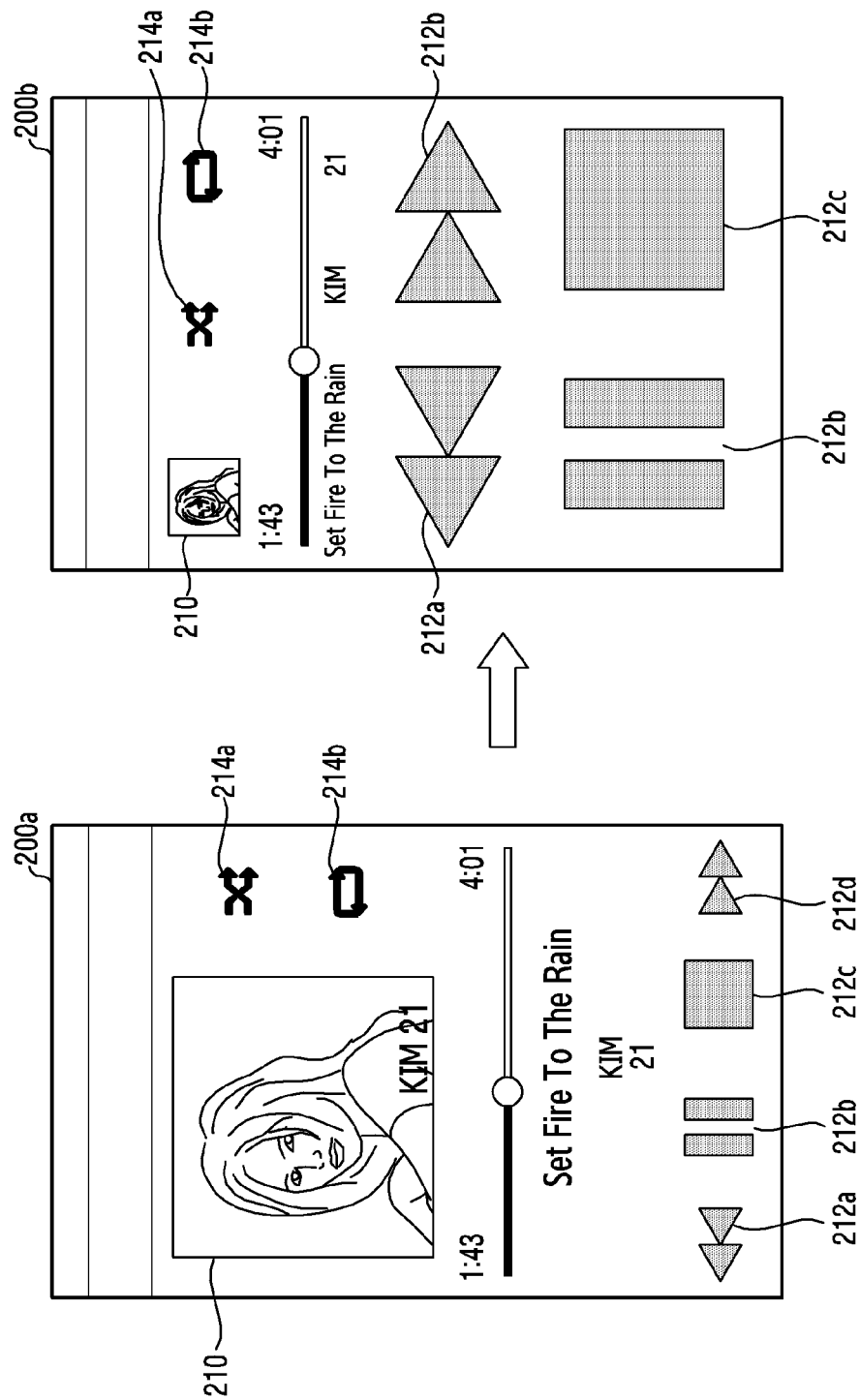
FIG. 2 is a diagram illustrating an operation of displaying a UI including objects of which the sizes are changed according to various embodiments.

FIG. 2 is a diagram illustrating an operation of displaying a UI including objects of which the sizes are changed according to various embodiments. In FIG. 2, it is assumed that a music application runs in an electronic device, and the electronic device may provide a UI according to the same principal, even when another application runs (e.g., a media reproduction application, a game application, a schedule application, a text or call application, or the like).

Referring to FIG. 2, the electronic device displays a UI 200a indicating that music is being reproduced. The UI 200a may include at least one object. For example, the UI 200a may include an image 210 related to music that is currently reproduced, a rewind button 212a, a pause button 212b, a stop button 212c, a fast-forward button 212d, a random button 214a, and a repeat button 214b. Although not illustrated in FIG. 2, another object may be included in the UI 200a depending on the embodiment. For example, a play button, a song list button, and/or a menu button may be further included.

In a normal situation, a user of the electronic device may normally select an object included in the UI 200a. However, when the electronic device detects the situation in which the user has difficulty in normally selecting the object (e.g., when the user is moving), the electronic device may display a UI 200b in which some objects are enlarged. Also, the remaining objects to which an input is less frequently provided by the user may be displayed as they are or may be displayed to be smaller than those of the normal state. For example, the rewind button 212a, the pause button 212b, the stop button 212c, and the fast-forward button 212d may be displayed in enlarged sizes. Also, when it is determined that the image 210 is less frequently selected, the electronic device may display the image 210 of which the size is reduced. Objects included in the UI 200b may be rearranged according to changed sizes. For example, the rewind button 212a and the fast-forward button 212d may be located in the center of the UI 200b, and the pause button 212b and the stop button 212c may be disposed in the lower portion of the UI 200b. Also, the image 210, the random button 214a, and the repeat button 214b may be arranged at regular intervals.

Figure 3A:
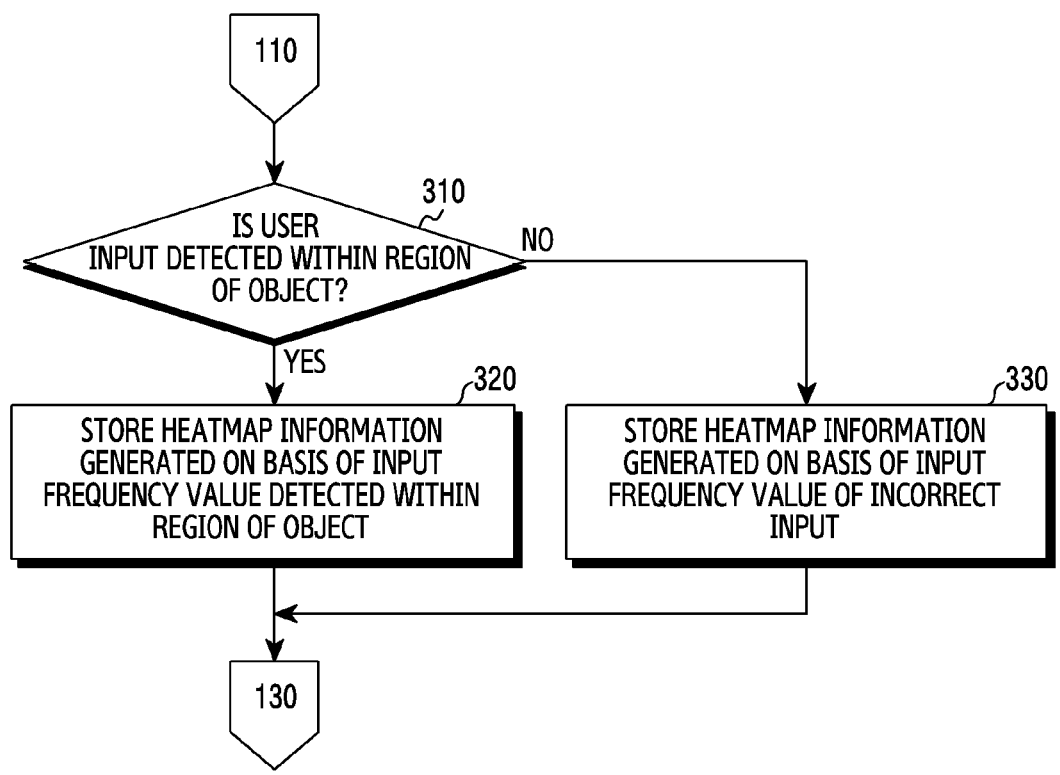
FIG. 3A to 3C are diagrams illustrating an operation of storing, by an electronic device, heatmap information associated with a user input according to various embodiments.
Figure 3B:
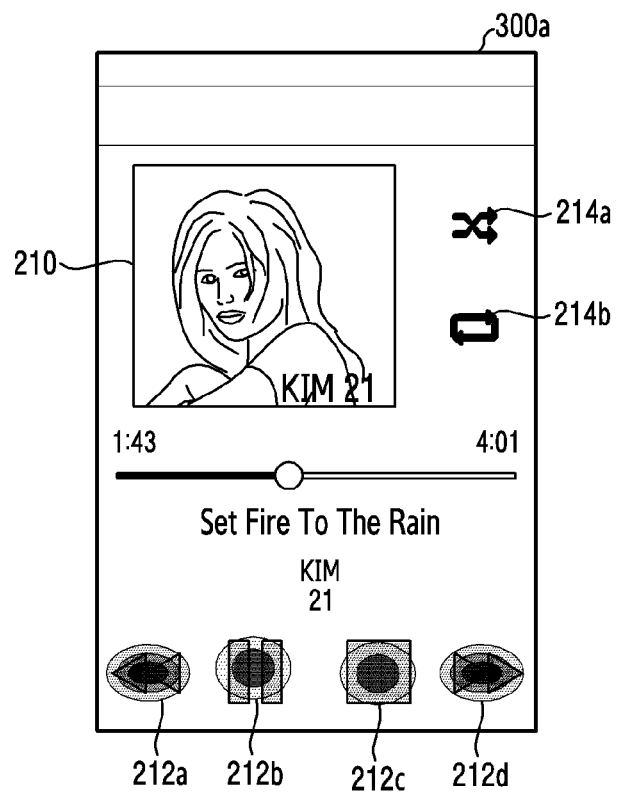
Figure 3C:
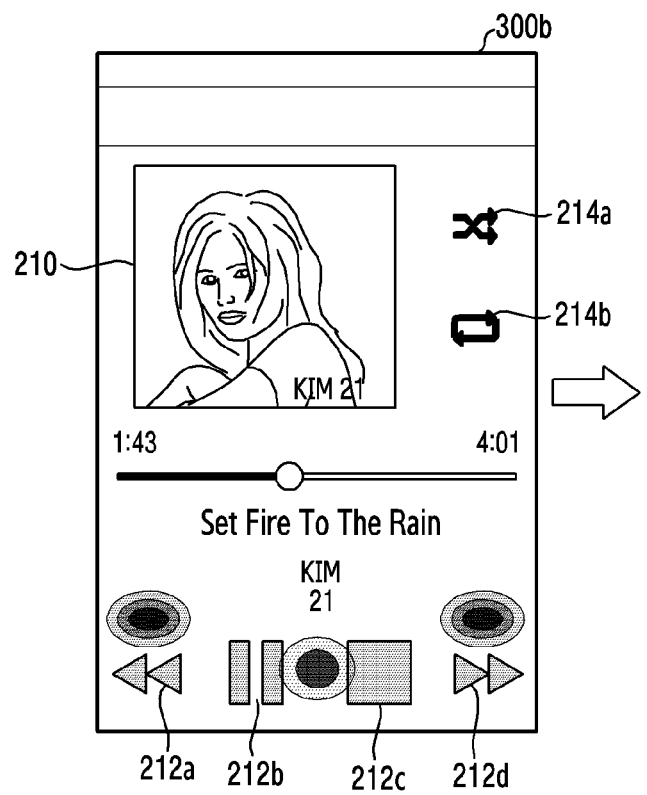

FIG. 3A to 3C are diagrams illustrating an operation of storing, by an electronic device, heatmap information associated with a user input according to various embodiments. Some of the operations may be omitted or added depending on a method of implementing each of the operations illustrated in FIG. 3A, and the same operation may be repeatedly performed.

Referring to FIG. 3A, after the electronic device displays the UI including the object having the first size in operation 110, the electronic device determines whether a user input is detected within the region of the displayed object in operation 310. The region of the object indicates the range of an input used for recognizing that a user selects the object. For example, referring to FIG. 3B, when a user input is detected from the rewind button 212a, the pause button 212b, the stop button 212c, or the fast-forward button 212d, the electronic device may determine that a user input is detected within the region of each object. In this instance, the electronic device may proceed with operation 320.

When a user input is detected beyond the region of a displayed object, the electronic device may proceed with operation 330. A method of determining whether a user input is detected beyond the region of an object may vary depending on implementation. According to an embodiment, when a user input is detected beyond the regions of a plurality of displayed objects (i.e., a region where the objects are not displayed), the electronic device may determine that a user input is not detected within the region of an object. For example, referring to FIG. 3C, the user of the electronic device abnormally provides an input to the fast-forward button 212a due to the certain context which the user is in (e.g., when the user is moving or when the eyesight of the user is poor), but may repeatedly provide an input to the upper portion of the rewind button 212a. In this instance, the electronic device may determine that the user input detected from the upper portion of the rewind button 212a to be an incorrect input. Also, the user of the electronic device may abnormally provide an input to the pause button 212b and the stop button 212c due to a certain context which the user is in, but may repeatedly provide an input to a region between the pause button 212b and the stop button 212c. In this instance, the electronic device may determine that the user input detected between the pause button 212b and the stop button 212c to be an incorrect input.

According to another example, the electronic device may determine that the user selects an unintended object. For example, when the electronic device receives a user input to one of a plurality of displayed objects, and receives an input in order to cancel the user input within a predetermined period of time after receiving the user input, the electronic device may determine that the user provides an input to the unintended object (i.e., an incorrect input is detected).

In operation 320, the electronic device may store heatmap information associated with the object which is generated on the basis of the input frequency value of a user input detected during a predetermined period of time. A heatmap may be information representing frequencies of occurrence of events (detected user inputs) that occur within a predetermined region in different colors. The heatmap information may be information generated on the basis of the input frequency value (e.g., 10 times, 50 times, or 100 times) of a user input which is accumulated during a predetermined period of time (e.g., a year, six months, one month, or a week). The heatmap may be represented in different colors on the basis of an input frequency value. As an input frequency value is high, the heatmap may be represented in more various colors. For example, referring to FIG. 3B, when a user input is detected from each of the rewind button 212a, the pause button 212b, the stop button 212c, and the fast-forward button 212d, the electronic device may generate a heatmap on the basis of the detected input frequency value. When the frequency value of a user input (e.g., 130 times a week) detected from the rewind button 212a and the fast-forward button 212d is greater than the frequency value of a user input (e.g., 75 times a week) detected from the pause button 212b and the stop button 212c, the electronic device may generate a heatmap including more various colors in the case of the rewind button 212a and the fast-forward button 212d. For example, the heatmap for each of the pause button 212b and the stop button 212cd may be represented using one or more colors from among green and yellow. The heatmap for each of the rewind button 212a and the fast-forward button 212d may be represented using one or more from among green, yellow, and red. The electronic device may store information associated with the generated heatmap in a storage unit of the electronic device. Also, the electronic device may update the heatmap information on the basis of a user input newly detected during a predetermined period of time.

In operation 330, the electronic device may store heatmap information generated on the basis of the input frequency value of the incorrect input. The electronic device may generate heatmap information associated with the incorrect input according to a similar principal to that of an operation implemented in operation 340. For example, referring to FIG. 3C, the electronic device may generate heatmap information associated with a user input repeatedly detected from the upper portion of the rewind button 212a (or the fast-forward button 212d). Also, the electronic device may generate heatmap information associated with a user input repeatedly detected from a region between the pause button 212b and the stop button 212c.

Figure 4A:
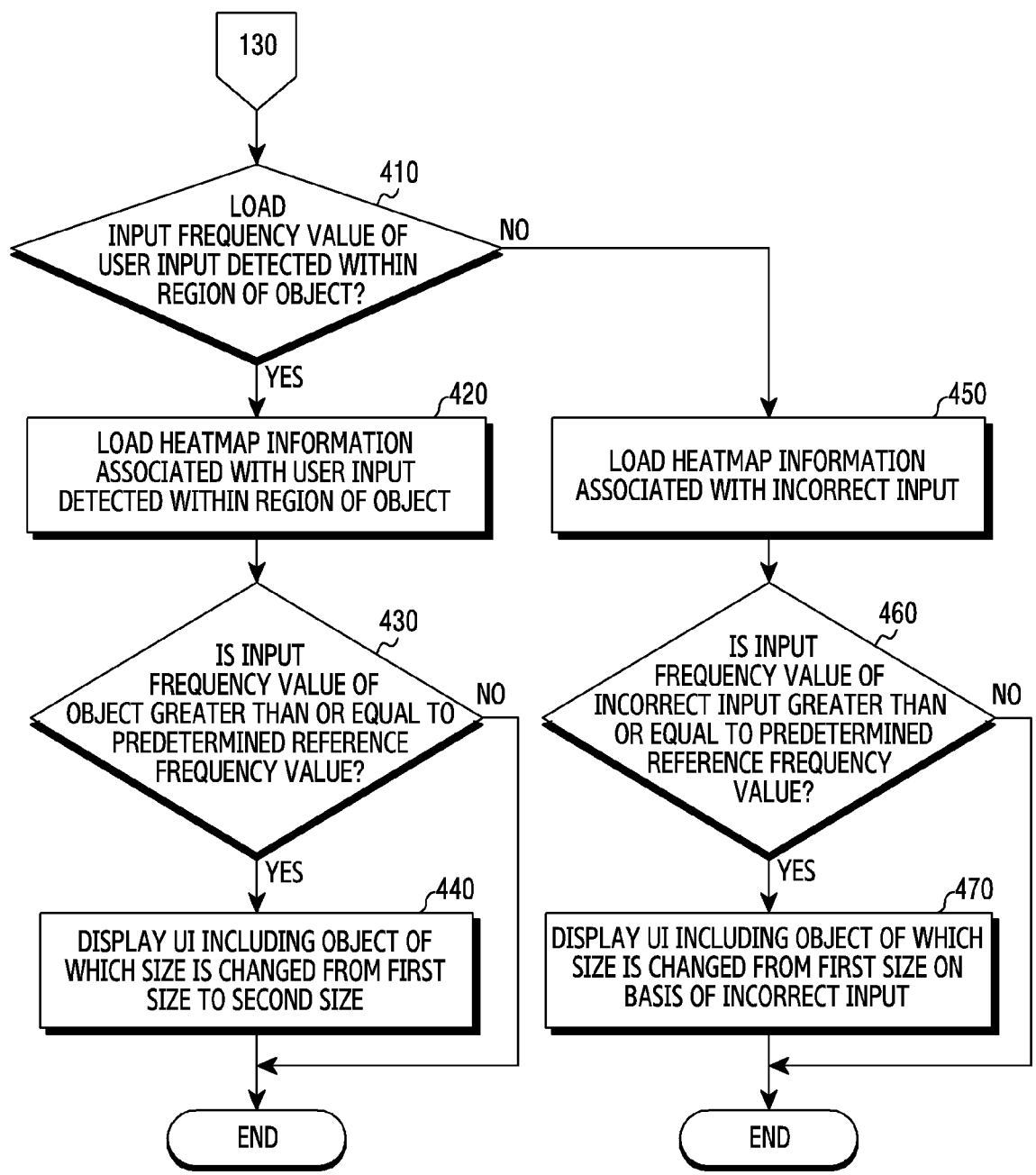
FIGS. 4A to 4C are diagrams illustrating an operation of adaptively providing, by an electronic device, a UI according to various embodiments.
Figure 4B:
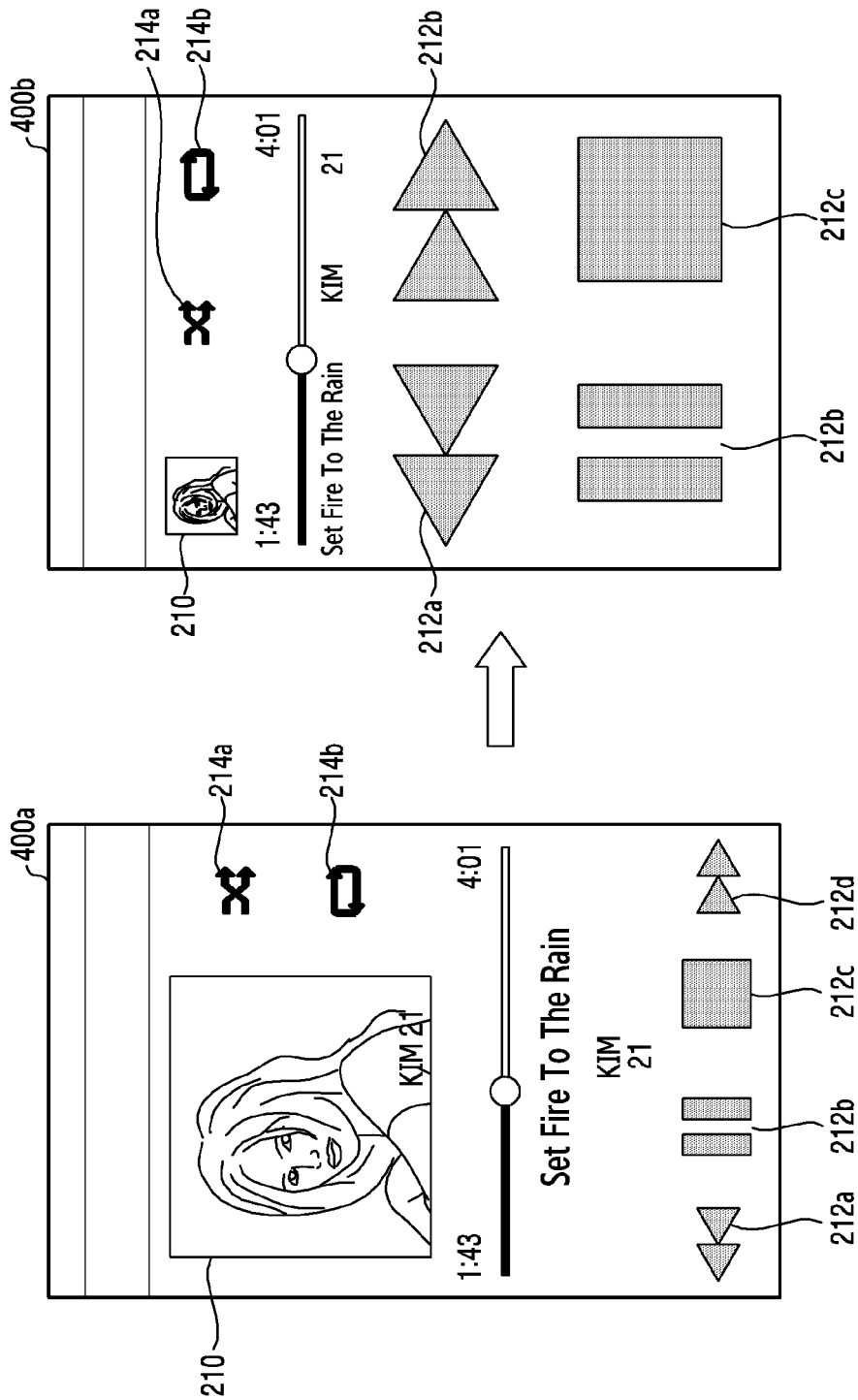
Figure 4C:
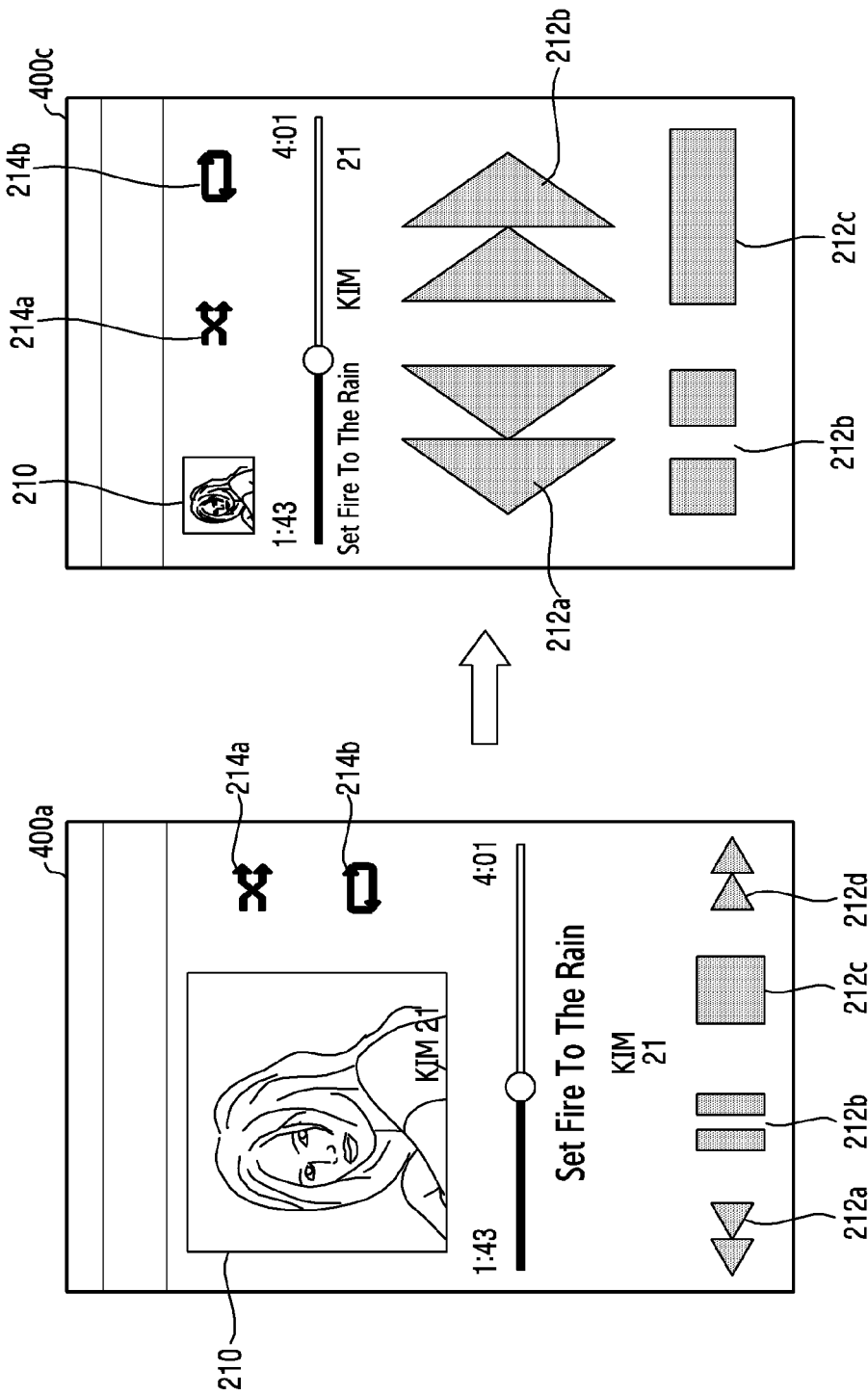

FIGS. 4A to 4C are diagrams illustrating an operation of adaptively providing, by an electronic device, a UI according to various embodiments. Operations illustrated in FIG. 4A are detailed implementations of the operations in operation 130 illustrated in FIG. 1. Some of the operations may be omitted or added depending on a method of implementing each of the operations illustrated in FIG. 4A, and the same operation may be repeatedly performed.

Referring to FIG. 4A, after the movement of the electronic device is detected in operation 120, the electronic device may determine whether to load the input frequency value of a user input detected within the region of an object, or to load the input frequency value of an incorrect input in operation 410. According to an embodiment, according to a previously designated setting, the electronic device may automatically load the input frequency value of a user input detected within the region of the object when movement of the electronic device is detected. In this instance, the electronic device may change the setting on the basis of an update history of information indicating the input frequency of a detected user input. For example, although the electronic device is set to load the input frequency value of a user input detected within the region of the object, when the frequency of an incorrect input, which is detected during a predetermined period of time, is a predetermined rate higher than the frequency of a user input detected within the region of the object, the electronic device may change the setting so as to load the input frequency value of the incorrect input. According to another embodiment, the user of the electronic device may designate information to load. For example, when movement of the electronic device is detected, the user of the electronic device may set the electronic device to load the input frequency value of a user input detected within the region of the object. When the electronic device determines to load the input frequency value of a user input detected within the region of the object, the electronic device may load heatmap information associated with the user input detected within the region of the object in operation 420. When the electronic device determines to load the input frequency value of an incorrect input, the electronic device may load heatmap information associated with the incorrect input in operation 450.

In operation 430, the electronic device may determine whether the input frequency value of the object is greater than a predetermined reference frequency value. The reference frequency value may vary depending on implementation. According to an embodiment, the reference frequency value may be a value set in advance in the electronic device (a default value). According to another embodiment, the reference frequency value may be a value designated by the user of the electronic device. For example, the user of the electronic device may set a reference frequency value to 100 times, which is the number of times that a user input is detected from a single object during a week. In this instance, if a user input is detected 120 times from a predetermined object during a week, the electronic device may determine that the input frequency value of the object is greater than or equal to the predetermined reference frequency value. When the input frequency value of the object is less than a predetermined reference frequency value, the electronic device may terminate an algorithm associated with the corresponding object. In other words, the electronic device may display an object of which the size is the same as or smaller than an object that is already displayed. When the input frequency value of the object is greater than or equal to a predetermined reference frequency value, the electronic device may proceed with operation 440.

In operation 440, the electronic device may display a UI including an object of which the size is changed from the first size to the second size according to a predetermined rate. The rate may vary depending on implementation. For example, the rate may be a value set in advance in the electronic device (a default value). As another example, the rate may be a value designated by the user of the electronic device. The rate may be expressed as percentages or a multiple (e.g., 1.5 times, 2 times, or 3 times).

For example, referring to FIG. 4B, until movement of the electronic device is detected, the electronic device may display a UI 400a including an image, the rewind button 210, the random button 214a, the repeat button 214b, the rewind button 212a, the pause button 212b, the stop button 212c, and the fast-forward button 212d. When movement of the electronic device is detected, the electronic device may display a UI 400b including the rewind button 212a, the pause button 212b, the stop button 212c, and the fast-forward button 212d which are enlarged by a predetermined rate since the input frequency value of a user input detected from the rewind button 212a, the pause button 212b, the stop button 212c, and the fast-forward button 212d is greater than or equal to a predetermined reference frequency value. In the case of the image 210, the frequency of a user input detected during a predetermined period of time is less than the reference frequency value, the image 210 may be displayed to be smaller than before in the UI 400b. The random button 214a and the repeat button 214b may be displayed in the UI 400b in sizes which are the same as, or similar to, previous sizes.

In operation 460, the electronic device may determine whether the input frequency value of an incorrect input is greater than or equal to the predetermined reference frequency value. The reference frequency value of an incorrect input may vary depending on implementation. For example, the reference frequency value of an incorrect input may be a value which is the same as the reference frequency value described in operation 430, or may be an independently determined value. When the input frequency value of the incorrect input to the object is less than the predetermined reference frequency value, the electronic device may terminate an algorithm associated with the corresponding object. In other words, the electronic device may display an object of which the size is the same as or smaller than an object that is already displayed. When the input frequency value of the incorrect object to the object is greater than or equal to the predetermined reference frequency value, the electronic device may proceed with operation 470.

In operation 470, the electronic device may display a UI including an object of which the size is changed from the first size on the basis of the incorrect input. For example, referring to FIG. 4C, until movement of the electronic device is detected, the electronic device may display the UI 400a including the image, the rewind button 210, the random button 214a, the repeat button 214b, the rewind button 212a, the pause button 212b, the stop button 212c, and the fast-forward button 212d. When movement of the electronic device is detected, the electronic device may display a UI 400c including objects, the shape of each being changed. In the case of the rewind button 212a and the fast-forward button 212d, a user input is frequently detected from the upper portion of the region of each object. Accordingly, the electronic device may display the rewind button 212a and the fast-forward button 212d which are enlarged in the vertical direction, in order to perform compensation associated with an incorrect input by the user. In the case of the pause button 212b and the stop button 212c, a user input is frequently detected from the left or the right portion of the region of each object. Accordingly, the electronic device may display the pause button 212b and the stop button 212c of which sizes are enlarged in the horizontal direction, in order to perform compensation of an incorrect input by the user.

Figure 5A:
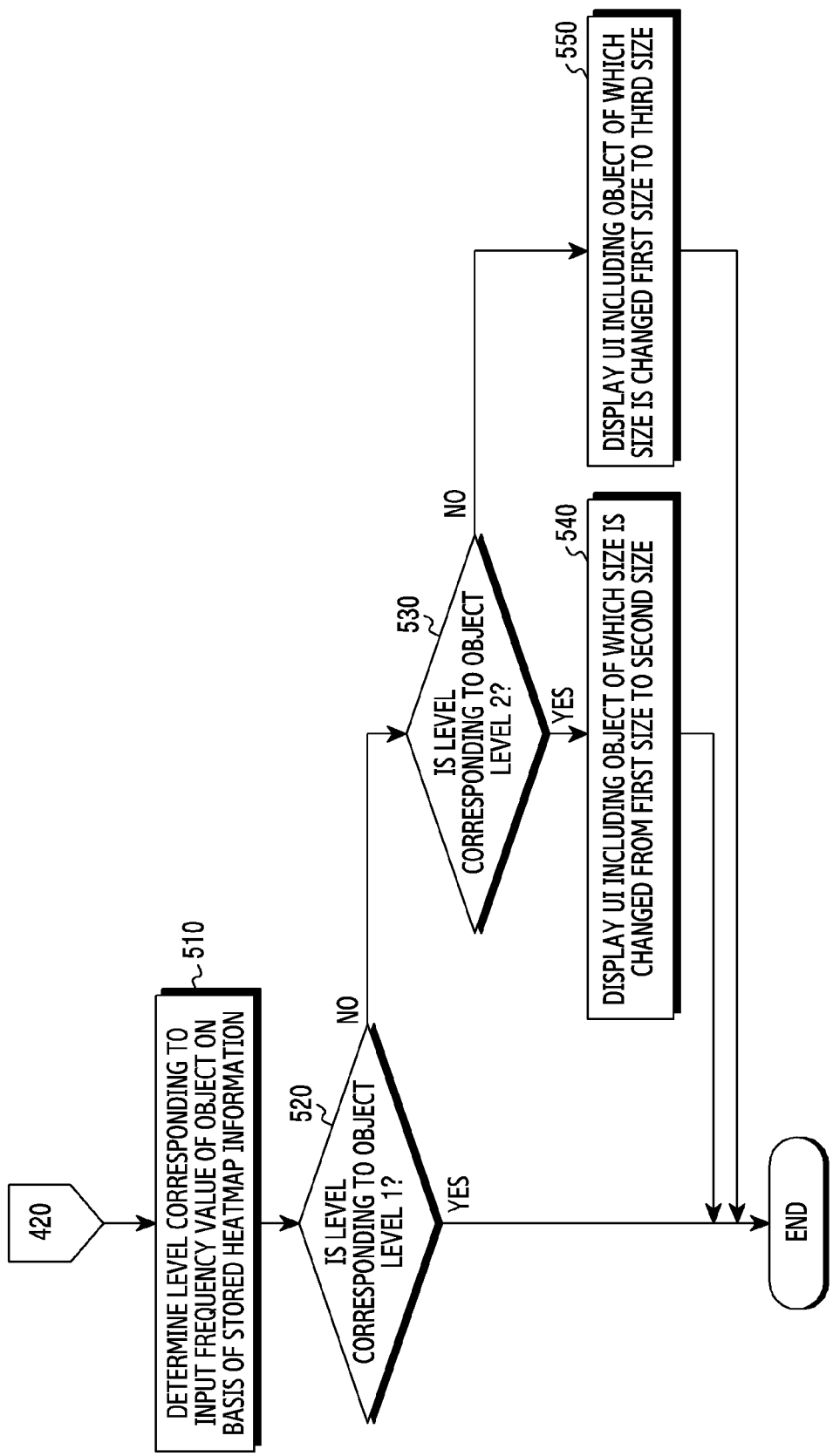
FIGS. 5A and 5B are diagrams illustrating an operation of providing, by an electronic device, a UI on the basis of an input frequency value level of each object according to various embodiments.
Figure 5B:
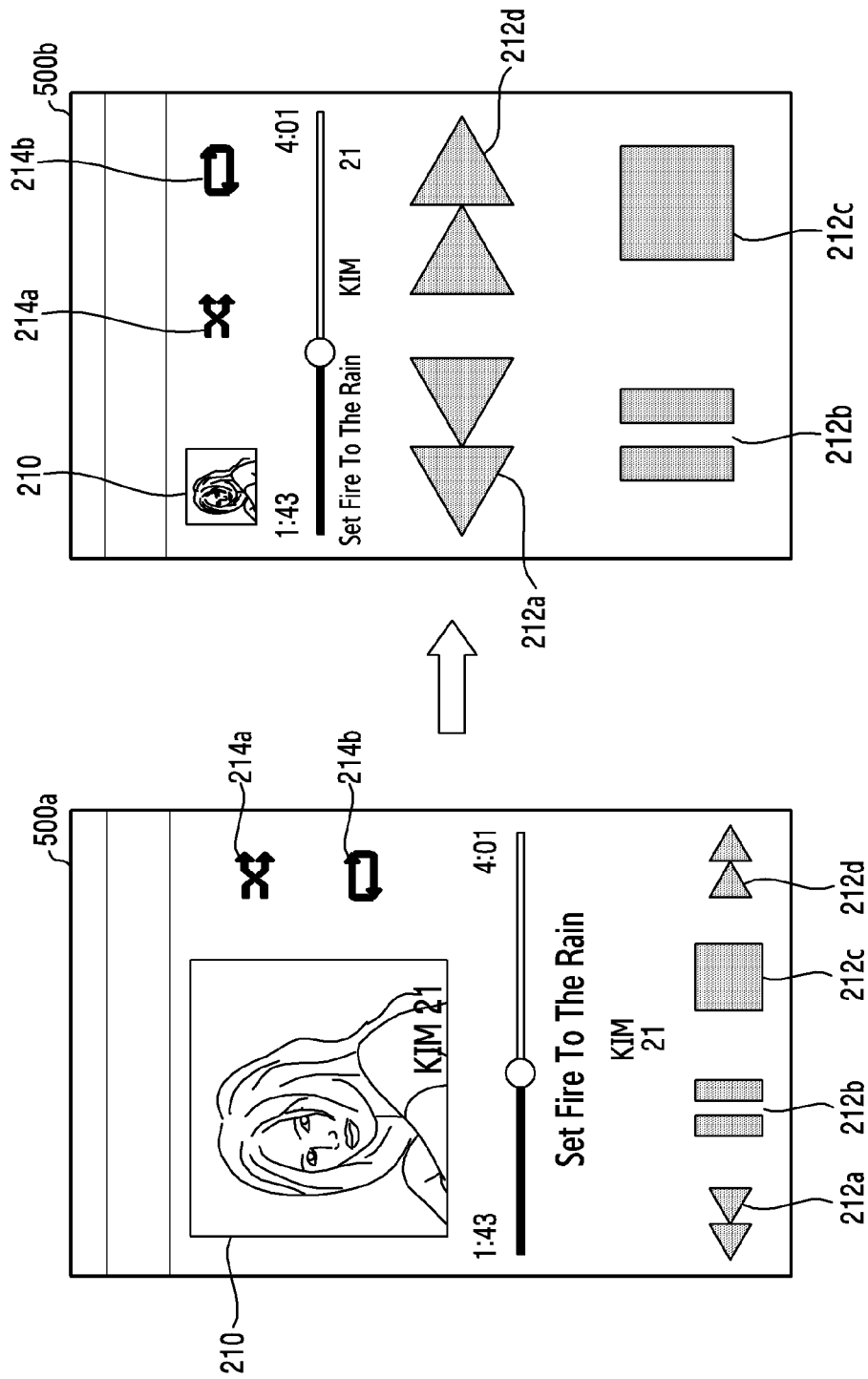

FIGS. 5A and 5B are diagrams illustrating an operation of providing, by an electronic device, a UI on the basis of an input frequency value level of each object according to various embodiments. Some of the operations may be omitted or added depending on a method of implementing each of the operations illustrated in FIG. 5A, and the same operation may be repeatedly performed.

Referring to FIG. 5A, after the electronic device loads the heatmap information associated with the user input detected within the region of the object in operation 420, the electronic device may determine a level corresponding to the input frequency value of the object in operation 510. The level may vary depending on implementation. According to an embodiment, the level may be a value set in advance in the electronic device (a default value). According to another embodiment, the level may be a value designated by the user of the electronic device. For example, when the frequency value of a user input detected from a single object during a predetermined period of time (e.g., a year, six months, one month, or a week) is less than 50 times, the user of the electronic device may set the level of the corresponding object to level 1. As another example, when the frequency value of a user input detected from a single object during the same period of time is greater than or equal to 50 times and less than 100 times, the user of the electronic device may set the level of the corresponding object to level 2. As another example, when the frequency value of a user input detected from a single object during the same period of time is greater than or equal to 100 times, the user of the electronic device may set the level of the corresponding object to level 3.

For example, referring to FIG. 5B, in a displayed UI 500a, the electronic device may determine the levels of the image 210, the random button 214a, and the repeat button 214b, from which a user input is not detected (in other words, the input frequency value is less than 50 times), to be level 1. Also, the electronic device may determine the levels of the pause button 212b and the stop button 212c, the input frequency value of a user input of which is 75 times, to be level 2. Also, the electronic device may determine the levels of the rewind button 212a and the fast-forward button 212d, the input frequency value of a user input of which is 130 times, to be level 3. The period and the number of times of detection, which are used for classifying a level, are merely an example, and are not limited to a predetermined period or a predetermined number of times. Also, although FIG. 5A illustrates three levels, three or more levels may be used depending on implementation.

In operation 520, the electronic device may determine whether the level corresponding to the object is level 1. When the level of the object is level 1, the electronic device may display an object in the same size as, or in a smaller size than, the size of a previously displayed object, and may terminate an algorithm. When the level of the object is different from level 1, the electronic device may proceed with operation 530.

In operation 530, the electronic device may determine whether the level corresponding to the object is level 2. When the level of the object is level 2, the electronic device may display an object of which the size is changed from the first size to the second size in operation 540. When the level of the object is different from level 2, the electronic device may display an object of which the size is changed from the first size to a third size in operation 550. The third size is a size enlarged from the second size. For example, referring to FIG. 5B, the pause button 212b and the stop button 212c corresponding to level 2 may be displayed in sizes enlarged to be greater than the image 210, the random button 214a, and the repeat button 214b which correspond to level 1. The rewind button 212a and the fast-forward button 212d which correspond to level 3 may be displayed in sizes enlarged to be greater than the pause button 2112b and the stop button 212c which correspond to level 2. The rate by which the size of an object is enlarged for each level may vary depending on implementation. For example, the rate may be a value set in advance in the electronic device (a default value). As another example, the rate may be a value designated by the user of the electronic device. The rate may be expressed as percentages (%) or a multiple (e.g., 1.5 times, 2 times, or 3 times).

The electronic device may display a UI including an object of which the size is changed from the first size to the second size using information stored in advance in the electronic device, in addition to information indicating the frequency of an input to the object. For example, the information stored in advance may include information associated with the eyesight of a user and information indicating whether a user usually wears glasses. When the eyesight of the user is less than a predetermined level, and the user does not wear glasses, the electronic device may need to provide a UI that displays an object of which the size is enlarged.

Figure 6A:
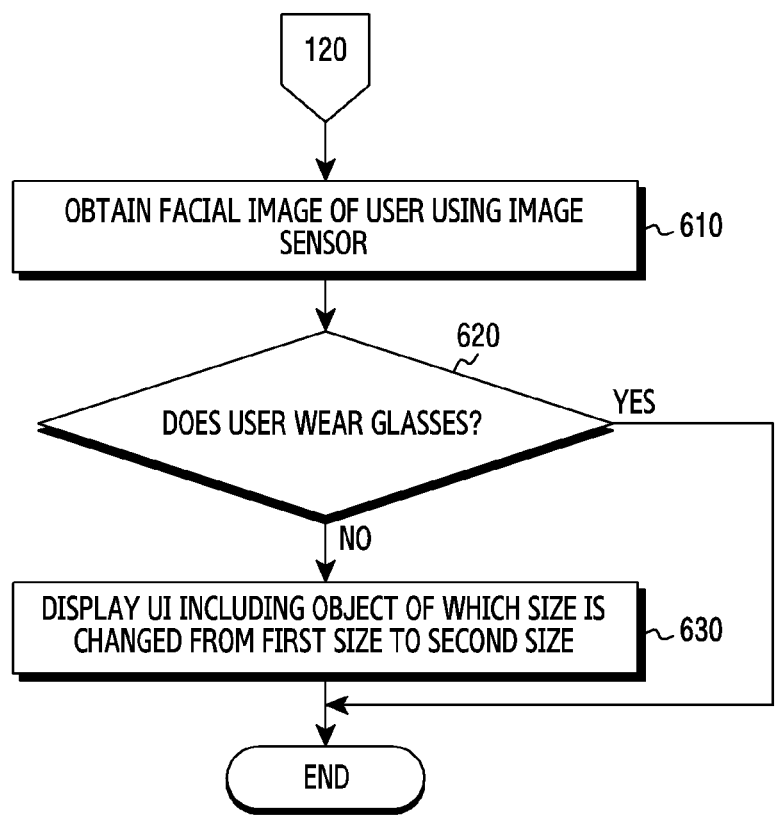
FIGS. 6A and 6B are diagrams illustrating an operation of providing, by an electronic device, a UI on the basis of an obtained facial image of a user according to various embodiments.
Figure 6B:
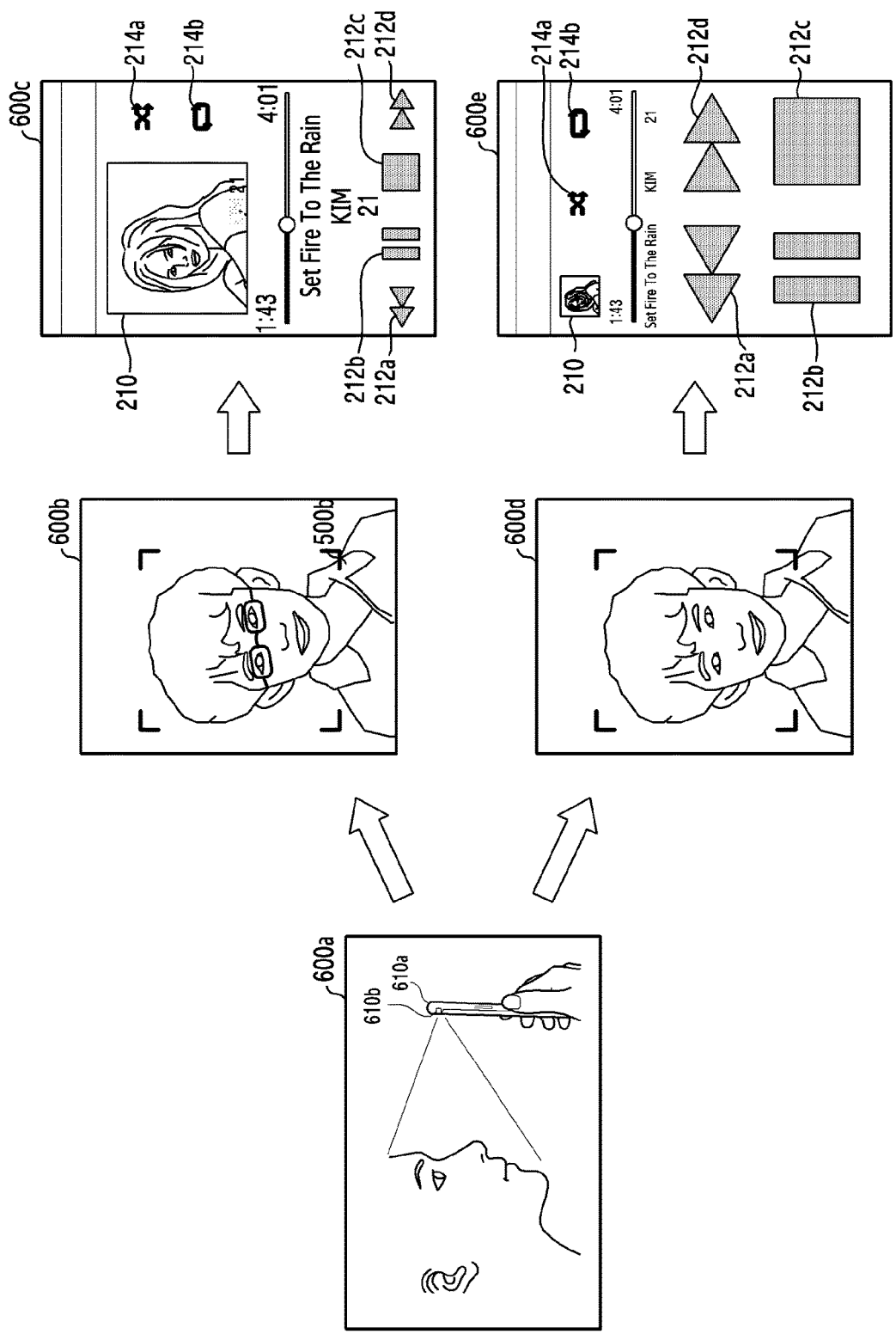

FIGS. 6A and 6B are diagrams illustrating an operation of providing, by an electronic device, a UI on the basis of an obtained facial image of a user according to various embodiments. Some of the operations may be omitted or added depending on a method of implementing each of the operations illustrated in FIG. 6A, and the same operation may be repeatedly performed.

Referring to FIG. 6A, when movement of the electronic device is detected in operation 120, the electronic device may obtain the facial image of a user using an image sensor included in the electronic device in operation 610. The operation in which the electronic device obtains the facial image may be triggered according to various methods. According to an embodiment, in response to detecting that the tilt of the electronic device changes, the electronic device may obtain the facial image. According to an embodiment, in response to initiation of the execution of an application in the electronic device, the electronic device may obtain the facial image. For example, referring to diagram 600a of FIG. 6B, a user of the electronic device 610a brings the electronic device 610a before the eyes of the user in order to check out a UI displayed in the electronic device 610a, an image sensor 610b installed in the electronic device 610a may obtain the facial image of the user.

In operation 620, the electronic device may determine whether the user of the electronic device wears glasses on the basis of the obtained facial image. As illustrated in diagram 600b of FIG. 6B, when it is determined that the user wears glasses, the electronic device terminates an algorithm and may display a UI 600c that displays objects of which the sizes are maintained as before. As illustrated in diagram 600d of FIG. 6B, when it is determined that the user does not wear glasses, the electronic device may proceed with operation 630.

In operation 630, the electronic device may display a UI including an object of which the size is changed from the first size to the second size. For example, referring to FIG. 6B, the electronic device may display a UI 600e including the rewind button 212a, the pause button 212b, the stop button 212c, and the fast-forward button 212d, which are enlarged by a predetermined rate. The rate may be a value set in advance in the electronic device, or may be a value designated by the user of the electronic device. The rate may be expressed as percentages (%) or a multiple (e.g., 1.5 times, 2 times, or 3 times).

Figure 7A:
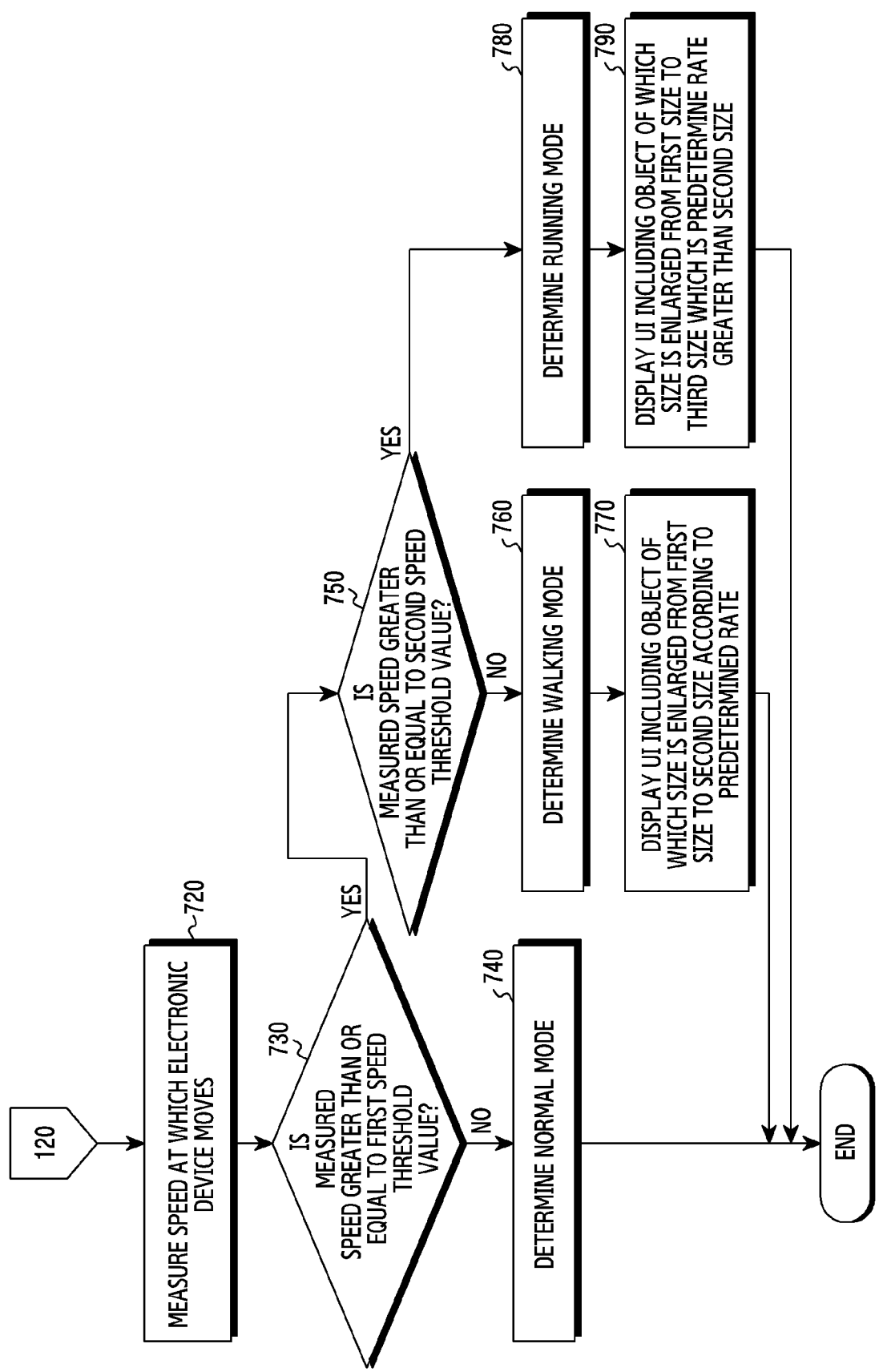
FIGS. 7A and 7B are diagrams illustrating an operation of providing, by an electronic device, a UI on the basis of information associated with the detected movement of an electronic device according to various embodiments.
Figure 7B:
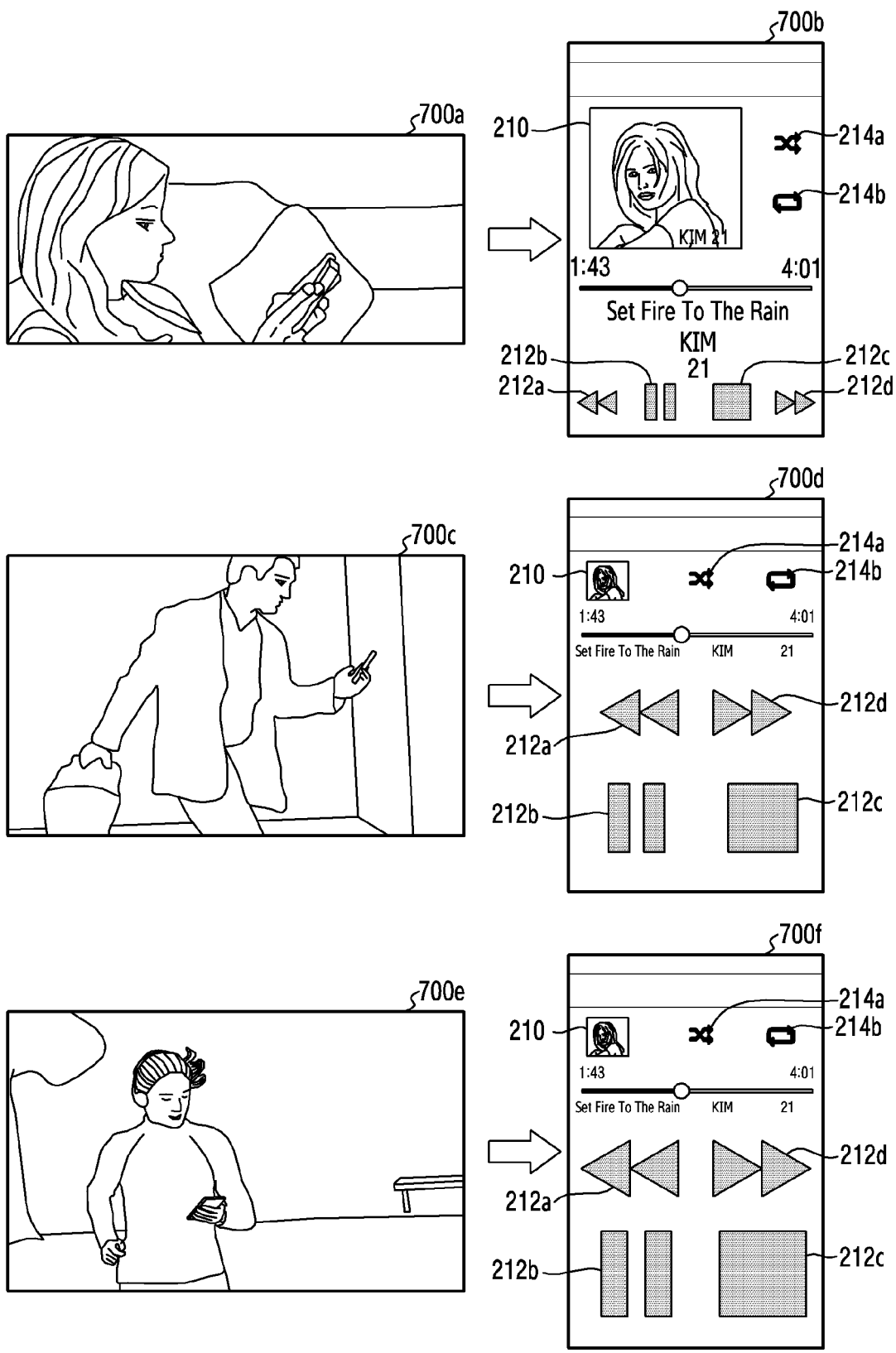

FIGS. 7A and 7B are diagrams illustrating an operation of providing, by an electronic device, a UI on the basis of information associated with detected movement of an electronic device according to various embodiments. Some of the operations may be omitted or added depending on a method of implementing each of the operations illustrated in FIG. 7A, and the same operation may be repeatedly performed. Also, the mode of the electronic device described hereinafter (e.g., a normal mode, a walking mode, and a running mode) is merely a name arbitrarily designated for ease of description, and the scope of a right is not limited by the name.

Referring to FIG. 7A, in operation 720, the electronic device may measure the speed of movement of the electronic device using at least one sensor included in the electronic device. The speed of the movement of the electronic device may be measured using various methods depending on implementation. As an example, the electronic device may measure the location of the electronic device using a GPS included in the electronic device, and may measure the speed of the movement of the electronic device on the basis of the distance that the electronic device moves during a predetermined period of time. As another example, the electronic device may measure the tilt, rotation, and/or movement speed of the electronic device using at least one of a gravity sensor, a gyro sensor, and an acceleration sensor.

The electronic device may measure the degree of movement of the electronic device, in addition to the speed of movement of the electronic device. For example, the electronic device may measure the number of times that movement of the electronic device is detected (e.g., 5 times, 10 times, or 10 times) during a predetermined period of time (e.g., 3 seconds, 5 seconds, or 10 seconds) using the at least one sensor. The electronic device may measure the speed of movement (or the degree of movement) of the electronic device, and may determine whether a user does not move (normal mode), whether the user is walking (walking mode), and whether the user is running (running mode).

In operation 730, the electronic device may determine whether the measured speed is greater than or equal to a first speed threshold value. The first speed threshold value may vary depending on implementation. For example, the first speed threshold value may be a value set in advance in the electronic device (a default value). As another example, the first speed threshold value may be arbitrarily set by the user of the electronic device. As another example, the first speed threshold value may be a value updated by taking into consideration the gender, age, the medical history of the user stored in advance. For example, the first speed threshold value may be set to the normal speed of an adult male when walking (e.g., 6-8 km/h or 100 times per minute, which is the number of times that movement is made during a minute). As another example, when information associated with a certain disease (e.g., arthritis) of the user of the electronic device is input to the electronic device, the first speed threshold value may be updated to a lower value (e.g., 2-3 km/h or 5 times per minute, which is the number of times that movement is made during a minute) in consideration of the context which the user is in. When it is determined that the measured speed is less than the first speed threshold value, the electronic device may proceed with operation 740. When it is determined that the measured speed is greater than or equal to the first speed threshold value, the electronic device may proceed with operation 750.

In operation 740, the electronic device may determine that the electronic device is in the normal mode. For example, referring to FIG. 7B, as illustrated in diagram 700a, the electronic device may determine that the user is not moving. In this instance, the electronic device terminates an algorithm, and may display a UI 700b in which the sizes of previously displayed objects are maintained as they were.

In operation 750, the electronic device may determine whether the measured speed is greater than or equal to a second speed threshold value. The second speed threshold value may be set using various methods according to a similar principal as that of the first speed threshold value. In other words, the second speed threshold value may be a value set in advance, a value arbitrarily designated by a user, or a value updated on the basis of user information stored in advance. For example, the second speed threshold value may be set to the normal speed of an adult male when running (e.g., 8 km or more/h or 150 times per minute, which is the number of times that movement is made during a minute). When it is determined that the measured speed is less than the second speed threshold value, the electronic device may proceed with operation 760. When it is determined that the measured speed is greater than or equal to the second speed threshold value, the electronic device may proceed with operation 780.

In operation 760, the electronic device may determine that the electronic device is in the walking mode. For example, referring to FIG. 7B, as illustrated in diagram 700c, the electronic device may determine that the user is walking at a constant speed. In this instance, the electronic device may display a UI including an object of which the size is changed from the first size to the second size according to a predetermined rate in operation 770. For example, the electronic device may display a UI 700d including the rewind button 212a, the pause button 212b, the stop button 212c, and the fast-forward button 212d, of which the sizes are enlarged to be larger than the sizes of objects displayed in the normal mode. The rate may vary depending on implementation. The rate may be a value set in advance in the electronic device, or may be a value designated by the user of the electronic device. The rate may be expressed as percentages or a multiple (e.g., 1.5 times, 2 times, or 3 times).

In operation 780, the electronic device may determine that the electronic device is in the running mode. For example, referring to FIG. 7B, as illustrated in diagram 700e, the electronic device may determine that the user is running at a constant speed. In this instance, the electronic device may display a UI including an object of which the size is changed from the first size to a third size, which is a predetermined rate greater than the second size, in operation 790. For example, as illustrated in FIG. 7B, the electronic device may display a UI 700f including the rewind button 212a, the pause button 212b, the stop button 212c, and the fast-forward button 212d, of which the sizes are enlarged to be larger than the sizes of objects displayed in the walking mode. The rate may vary depending on implementation. The rate may be a value set in advance in the electronic device, or may be a value designated by the user of the electronic device. The rate may be expressed as percentages or a multiple.

Figure 8:
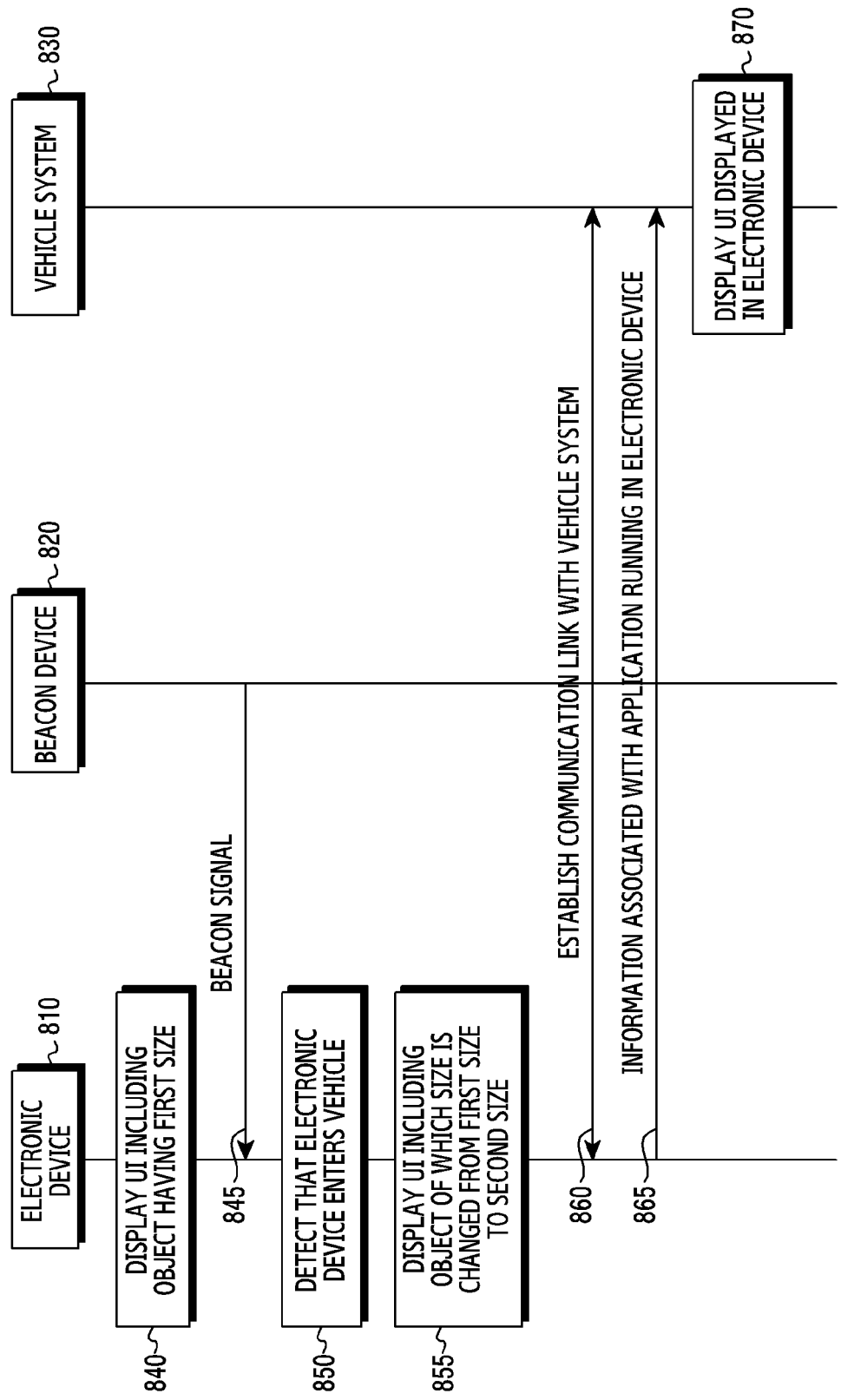
FIG. 8 is a diagram illustrating an operation of providing, by an electronic device, a UI in response to detecting entry into a vehicle according to an embodiment.

FIG. 8 is a diagram illustrating an operation of providing, by an electronic device, a UI in response to detecting entry into a vehicle according to an embodiment. Some of the operations may be omitted or added depending on a method of implementing each of the operations illustrated in FIG. 8, and the same operation may be repeatedly performed.

Referring to FIG. 8, in operation 840, an electronic device 810 may display a UI including an object having a first size. For example, when a music application runs in the electronic device, the object may be an album image of a predetermined artist, a play button, a pause button, a stop button, a rewind button, a fast-forward button, a repeat button, a random button, and the like.

In operation 845, the electronic device 810 may receive a beacon signal from a beacon device 820. The electronic device 810 may receive a beacon signal from the beacon device 820 via various communication schemes. For example, the beacon device 820 may broadcast fixed information included in a packet to the electronic device 810. The fixed information may include various pieces of information. For example, the beacon signal may include an identifier of the beacon device 820.

In operation 850, the electronic device 810 may determine that the electronic device 810 enters a vehicle on the basis of the received beacon signal. For example, the electronic device 810 may identify a vehicle system 830 of the vehicle where the electronic device 810 is located, on the basis of identification information included in the beacon signal. The vehicle system 830 may be a device embedded in the vehicle, or may be an external device that is wiredly or wirelessly connected to the vehicle.

In operation 855, the electronic device 810 may display a UI including an object of which the size is changed from the first size to a second size according to a predetermined rate on the basis of information stored in advance. The information stored in advance may be one or more pieces of information from among heatmap information indicating the input frequency value of a user input, heatmap information indicating the input frequency value of a user input detected beyond a region of the object, or information associated with the user of the electronic device 810 (e.g., the eyesight information of the user). The rate may be a value set in advance in the electronic device 810, a value arbitrarily designated by the user of the electronic device 810, or may be information updated on the basis of information associated with the user. FIG. 8 illustrates an operation of displaying a UI including an object of which the size is automatically changed from the first size to the second size in response to the reception of a beacon signal by the electronic device 810. However, depending on implementation, the electronic device 810 may display a new UI in order to identify whether to display the UI including the object of which the size is changed to the second size. In this instance, the electronic device 810 may display the UI including the object of which the size is changed to the second size, in response to a user input to select displaying the UI including the object of which the size is changed to the second size.

In operation 860, the electronic device 810 may establish a communication link with the vehicle system 830 in order to share information associated with an application that is running in the electronic device 810 with the vehicle system 830. For example, the electronic device 810 may establish a communication link with the vehicle system 830 via the communication standard such as wireless fidelity direct (Wi-Fi direct), an infrared ray (IR), Bluetooth, Zigbee, Z-wave, visible light communication (VLC), 3G, LTE, 5G and the like.

In operation 865, the electronic device 810 may transmit the information associated with the application that is running in the electronic device 810 to the vehicle system 830 via the established wireless communication link. The information associated with the application may include information associated with the UI of the application displayed in the electronic device 810 and information associated with size enlargement of objects included in the UI.

In operation 870, the vehicle system 830 may display the UI displayed in the electronic device 810 on the basis of information received from the electronic device 810. For example, when a music application is running in the electronic device 810, the vehicle system 830 may display a UI including objects such as a play button, a pause button, a stop button, a rewind button, a fast-forward button, a repeat button, a random button and the like. For the convenience of a user who is driving, the objects may be displayed in enlarged sizes.

Figure 9:
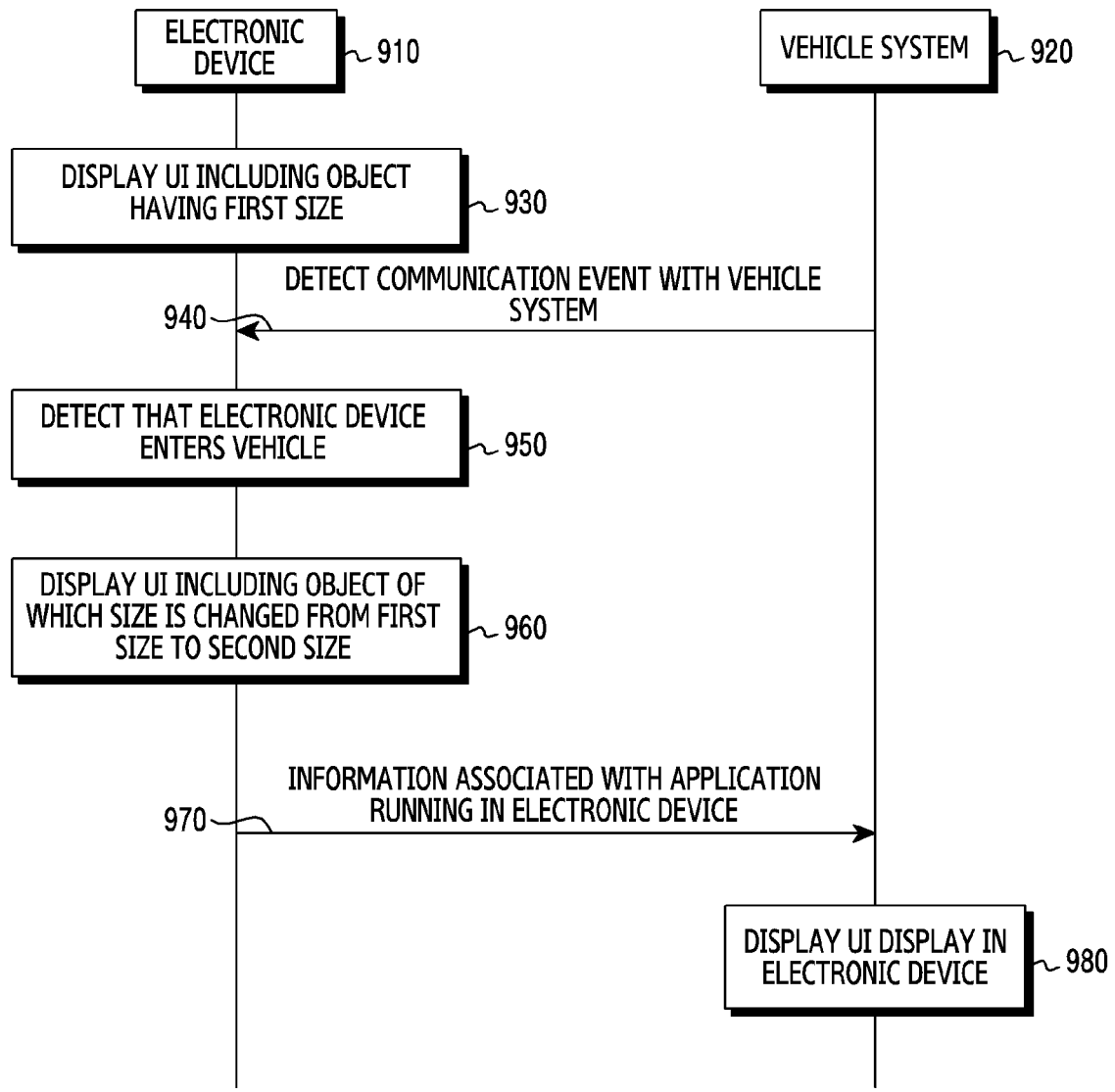
FIG. 9 is a diagram illustrating an operation of providing, by an electronic device, a UI in response to detecting entry into a vehicle according to another embodiment.

FIG. 9 is a diagram illustrating an operation of providing, by an electronic device, a UI in response to detecting entry into a vehicle according to another embodiment. Some of the operations may be omitted or added depending on a method of implementing each of the operations illustrated in FIG. 9, and the same operation may be repeatedly performed.

Referring to FIG. 9, an electronic device 910 displays a UI including an object having a first size in operation 930. For example, when a music application runs in the electronic device, the object may be an album image of a certain artist, a play button, a pause button, a stop button, a rewind button, a fast-forward button, a repeat button, a random button, and the like.

In operation 940, the electronic device 910 may detect a communication event with a vehicle system 920. For example, the electronic device 910 may identify that the electronic device 910 is capable of communicating with the vehicle system 920 via the communication standard such as WiFi direct, IR, near field communication (NFC), Bluetooth, Zigbee, Z-wave, VLC, 3G, LTE, and 5G. The vehicle system 920 may be a device embedded in the vehicle, or may be an external device that is wiredly or wirelessly connected to the vehicle.

In operation 950, on the basis of the detected communication event, the electronic device 910 may determine that the electronic device 910 enters a vehicle including the vehicle system 920. In operation 960, the electronic device 910 may display a UI including an object of which the size is changed from the first size to a second size according to a predetermined rate on the basis of information stored in advance. FIG. 9 illustrates an operation of displaying a UI including an object of which the size is automatically changed from the first size to the second size in response to the reception of a beacon signal by the electronic device 910. However, depending on implementation, the electronic device 910 may display a new UI in order to determine whether to display the UI including the object of which the size is changed to the second size. In this instance, the electronic device 910 may display the UI including the object of which the size is changed to the second size, in response to a user input to select displaying the UI including the object of which the size is changed to the second size.

In operation 970, the electronic device 910 may transmit information associated with an application that is running in the electronic device 910 in order to share the information associated with the application with the vehicle system 920. The information associated with the application may include an identifier of the application, and information used for enlarging the first size to the second size (e.g., heatmap information, enlargement rate, or the like).

In operation 980, the vehicle system 920 may display the UI displayed in the electronic device 910 on the basis of the information associated with the application received from the electronic device 910. For example, when the music application is running in the electronic device 910, the vehicle system 920 may display a UI including objects such as a play button, a pause button, a stop button, a rewind button, a fast-forward button, a repeat button, a random button and the like. The objects may be displayed in enlarged sizes.

Figure 10:
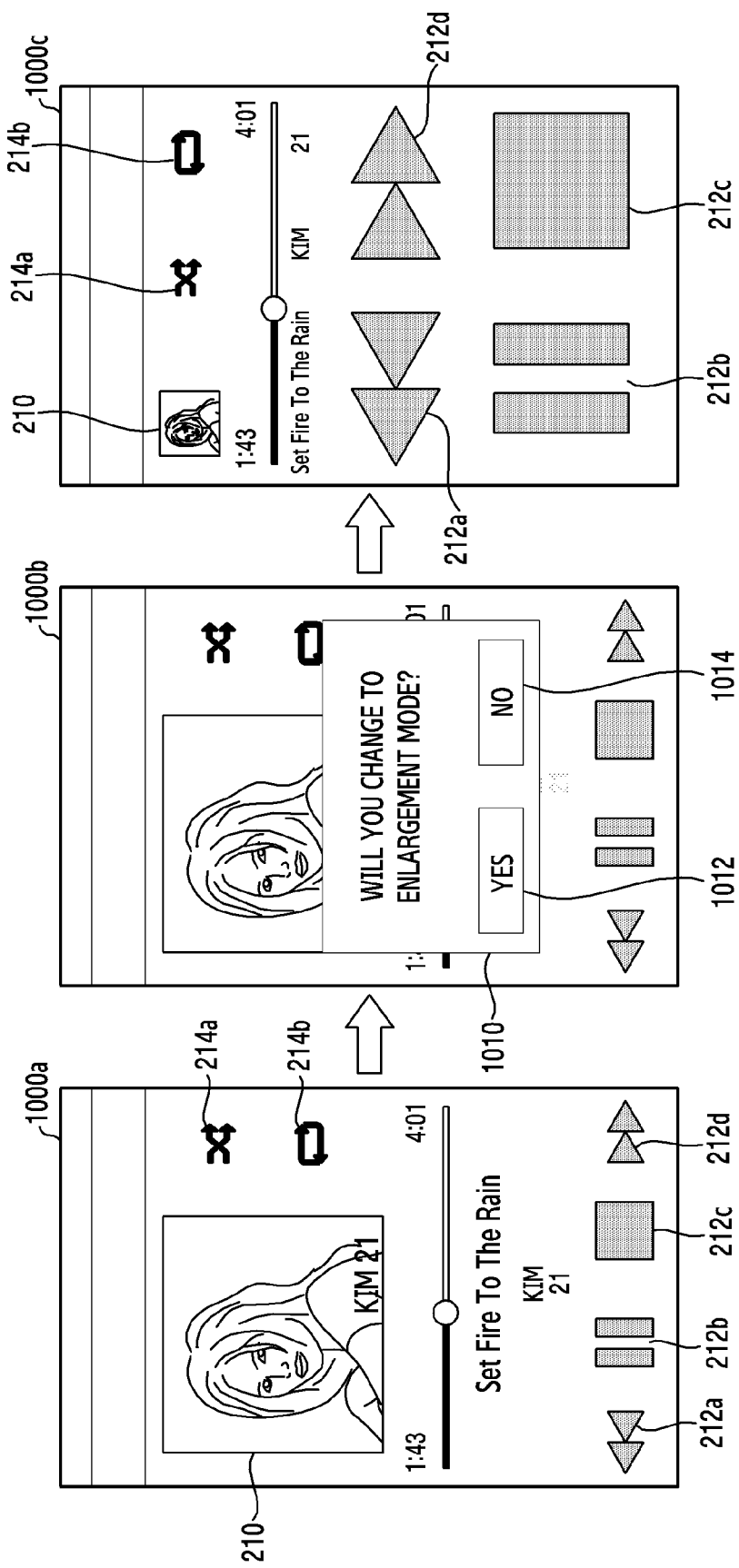
FIG. 10 is a diagram illustrating an operation of displaying a UI including an enlarged object according to various embodiments.

FIG. 10 is a diagram illustrating an operation of displaying a UI including an enlarged object according to various embodiments.

Referring to FIG. 10, an electronic device may display a UI 1000a associated with an application running in the electronic device when the electronic device is in a normal situation (i.e., in the normal mode). For example, when an application that is running in the electronic device is a music application, the electronic device may display a UI including an image or input buttons of which the sizes are not enlarged.

In response to detection of movement of the electronic device, the electronic device may display a UI 1010 to overlap the display UI 1000a, in order to determine whether to change to an enlargement mode. The enlargement mode may include one from among a mode of enlarging the sizes of some objects on the basis of heatmap information, a mode of enlarging the sizes of some objects on the basis of a level corresponding to each object, and a mode of enlarging the sizes of corresponding objects on the basis of an input sensed beyond the region of each object. The detected movement may include one from among a movement speed of the electronic device, a facial image, information associated with whether a user wears glasses, and information associated with whether the electronic device enters a vehicle. The UI 1010 may include selection buttons 1012 and 1014. When a user input is detected from the selection button 1012 indicating "YES", the electronic device may display a UI 1000c in which the size of each object is enlarged. When a user input is detected from the selection button 1014 indicating "NO", the electronic device may maintain the previously displayed UI 1000a.

As described above, an operation method of an electronic device that provides a user interface may include: displaying a UI including an object which has a first size and is used for executing at least one function of an application running in the electronic device; storing information indicating the frequency of a user input detected from the object; detecting movement of the electronic device on the basis of data obtained via a sensor of the electronic device; and displaying a UI including the object, of which the size is changed from a first size to a second size in the UI on the basis of the information indicating the input frequency. The operation of storing the information indicating the input frequency may include: determining the input frequency value of a user input detected within the region of the object; and storing heatmap information associated with an input frequency related to the object, on the basis of the determined input frequency value.

According to an embodiment, the operation of displaying the UI including the object of which the size is changed from the first size to the second size may include: identifying whether the input frequency value of the object is greater than or equal to a predetermined reference frequency value; and when the input frequency value of the object is greater than or equal to the predetermined reference frequency value, displaying the UI including the object of which the size is changed from the first size to the second size.

According to another embodiment, the operation of displaying the UI including the object of which the size is changed from the first size to the second size may include: determining a level corresponding to the input frequency value of the object; and displaying a UI including the object of which the size is changed from the first size to the second size or a third size according to the level of the object, wherein the third size is greater than the second size, and the second size is greater than the first size.

According to an embodiment, the operation of storing the information indicating the input frequency may include: determining a user input detected beyond the region of the object, to be an incorrect input; and storing heatmap information associated with the incorrect input in the electronic device. The operation of displaying the UI including the object of which the size is changed from the first size to the second size may further include displaying a UI including the object of which a shape is changed on the basis of the incorrect input, on the basis of the detected movement and the frequency value of the incorrect input.

The method may further include displaying a UI including the object, of which the size is changed from the first size to the second size in the UI on the basis of the detected movement and information stored in advance in the electronic device, wherein the information stored in advance may include at least one from among size enlargement information set in advance in the electronic device, and information associated with an age, gender, eyesight, and medical history of a user of the electronic device.

According to an embodiment, the method may further include: obtaining a facial image of the user using an image sensor included in the electronic device when the eyesight of the user of the electronic device is less than a predetermined eyesight reference value; and identifying whether the user wears glasses on the basis of the obtained facial image, and the operation of displaying the UI including the object of which the size is changed from the first size to the second size may include displaying the UI including the object of which the size is changed from the first size to the second size when it is identified that the user does not wear glasses. According to an embodiment, the operation of detecting movement of the electronic device may include: measuring a speed at which the electronic device moves using a sensor included in the electronic device; and determining that the electronic device is in the normal mode when the measured speed is less than a predetermined first speed threshold value, determining that the electronic device is in the walking mode when the measured speed is greater than or equal to the first speed threshold value and less than a predetermined second speed threshold value, and determining that the electronic device is the running mode when the measured speed is greater than the second speed threshold value. The operation of displaying a UI including the object, of which the size is changed from the first size to the second size in the UI, may include: displaying the UI including the object of which the size is changed from the first size to the second size when the electronic device is in the walking mode; and displaying a UI including the object of which the size is changed from the first size to a third size when the electronic device is the running mode, wherein the third size is greater than the second size, and the second size is greater than the first size. According to another embodiment, the operation of detecting movement of the electronic device may include: identifying that the electronic device enters a vehicle. The operation of identifying that the electronic device enters the vehicle may include: receiving a beacon signal of a beacon installed in the vehicle, and identifying that the electronic device enters the vehicle; and performing near-field communication with a vehicle system installed in the vehicle, and identifying that the electronic device enters the vehicle.

Figure 11:
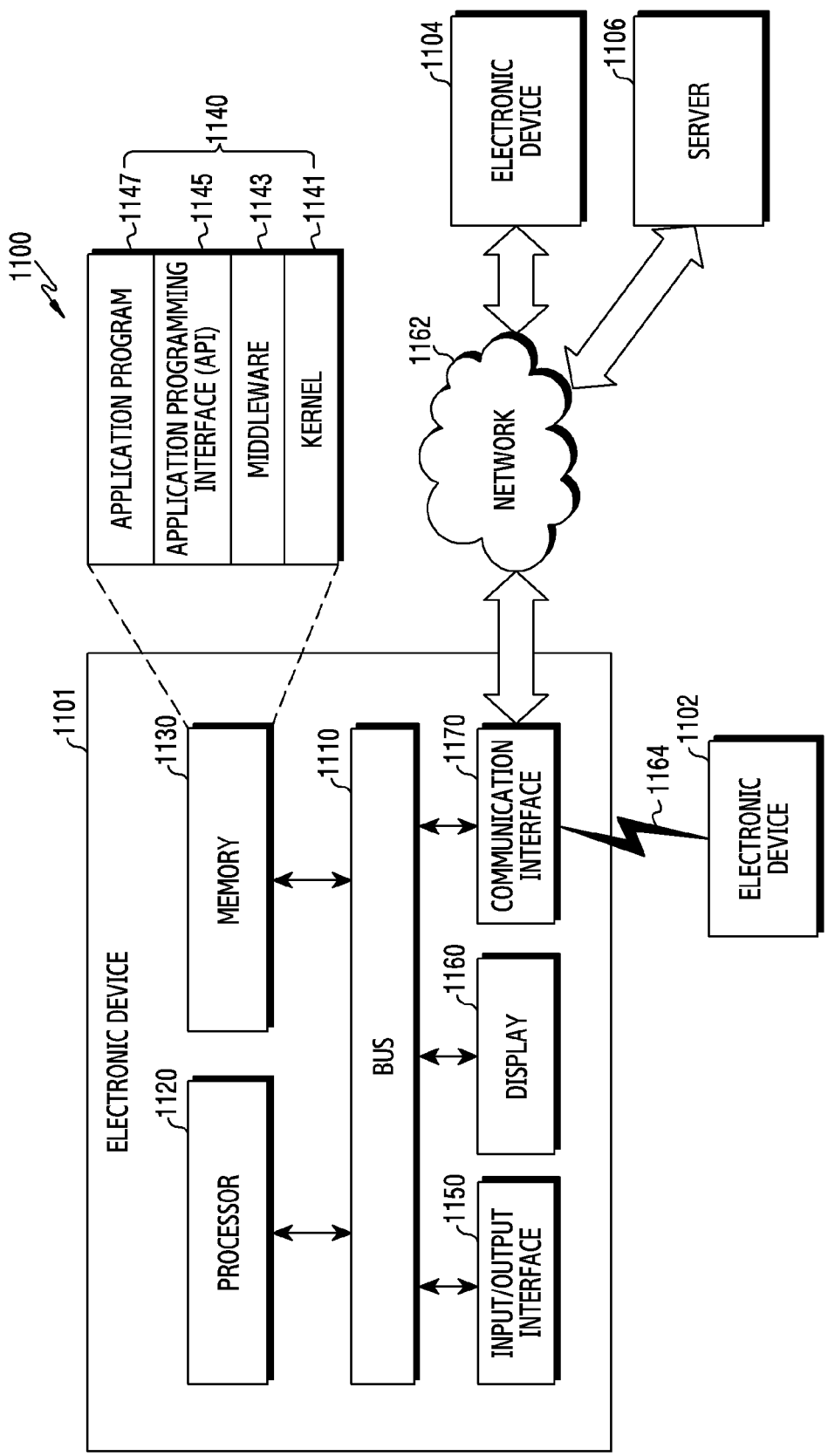
FIG. 11 is a diagram illustrating a network environment including an electronic device according to various embodiments.

FIG. 11 is a diagram illustrating a network environment including an electronic device according to various embodiments.

Referring to FIG. 11, an electronic device 1101 may include a bus 1110, a processor 1120, a memory 1130, an input/output interface 1150, a display 1160, and a communication interface 1170. According to an embodiment, the electronic device 1101 may omit at least one of the above components or may further include other components.

The bus 1110 may include a circuit that interconnects the components 1110 to 1170 and deliver communication (e.g., control messages and/or data) between the components. The processor 1120 may include one or more of a central processing unit (CPU), an application processor (AP), and a communication processor (CP). For example, the processor 1120 may execute calculation or data processing related to control and/or communication of at least one other component of the electronic device 1101.

The memory 1130 may include a volatile memory and/or a non-volatile memory. For example, the memory 1130 may store instructions or data relevant to at least one other component of the electronic device 1101. According to an embodiment, the memory 1130 may store software and/or a program 1140. The program 1140 may include, for example, a kernel 1141, middleware 1143, an application programming interface (API) 1145, and/or application programs (or "applications") 1147. At least some of the kernel 1141, the middleware 1143, and the API 1145 may be referred to as an operating system. The kernel 1141 may control or manage system resources (e.g., the bus 1110, the processor 1120, or the memory 1130) used for performing an operation or function implemented in the other programs (e.g., the middleware 1143, the API 1145, or the application programs 1147). Furthermore, the kernel 1141 may provide an interface via which the middleware 1143, the API 1145, or the application programs 1147 may access the individual components of the electronic device 1101 to control or manage the system resources.

The middleware 1143, for example, may serve as an intermediary for allowing the API 1145 or the application programs 1147 to communicate with the kernel 1141 to exchange data. Also, the middleware 1143 may process one or more task requests received from the application programs 1147 according to priority. For example, the middleware 1143 may assign priority to use the system resources (e.g., the bus 1110, the processor 1120, the memory 1130, or the like) of the electronic device 1101 to one or more of the application programs 1147, and may process the one or more task requests. The API 1145 is an interface used by the application 1147 to control a function provided from the kernel 1141 or the middleware 1143, and may include, for example, at least one interface or function (e.g., an instruction) for file control, window control, image processing, character control, or the like. For example, the input/output interface 1150 may forward instructions or data, input from a user or an external device, to the other component(s) of the electronic device 1101, or may output instructions or data, received from the other component(s) of the electronic device 1101, to the user or an external device.

The display 1160 may include, for example, a liquid crystal display (LCD), a light emitting diode (LED) display, an organic light emitting diode (OLED) display, a micro electro mechanical system (MEMS) display, or an electronic paper display. The display 1160 may display, for example, various types of content (or objects, for example, text, images, videos, icons, and/or symbols). The display 1160 may include a touch screen and may receive, for example, a touch, gesture, proximity, or hovering input using an electronic pen or a user's body part. The communication interface 1170 may establish communication between, for example, the electronic device 1101 and an external device (e.g., a first external electronic device 1102, a second external electronic device 1104, or a server 1106). For example, the communication interface 1170 may be connected to a network 1162 via wireless or wired communication to communicate with an external device (e.g., the second external electronic device 1104 or the server 1106).

The wireless communication may include, for example, cellular communication that uses at least one of LTE, LTE-Advance (LTE-A), code division multiple access (CDMA), wideband CDMA (WCDMA), universal mobile telecommunications system (UMTS), wireless broadband (WiBro), global system for mobile communications (GSM), or the like. According to an embodiment, the wireless communication may include, for example, at least one of wireless fidelity (WiFi), Bluetooth, Bluetooth low energy (BLE), ZigBee, near field communication (NFC), magnetic secure transmission, radio frequency (RF), or body area network (BAN). According to an embodiment, the wireless communication may include a GNSS. The GNSS may be, for example, a global positioning system (GPS), a global navigation satellite system (Glonass), a Beidou navigation satellite system (hereinafter, referred to as "Beidou"), or Galileo (the European global satellite-based navigation system). In the disclosure, the term "GPS" may be interchangeable with the term "GNSS". The wired communication may include, for example, at least one of a universal serial bus (USB), a high definition multimedia interface (HDMI), recommended standard 232 (RS-232), power line communication, a plain old telephone service (POTS), and the like. The network 1162 may include a telecommunication network, for example, at least one of a computer network (e.g., a LAN or a WAN), the Internet, and a telephone network.

Each of the first and second external electronic devices 1102 and 1104 may be a device of a type which is the same as, or different from, the electronic device 1101. According to various embodiments, all or some of the operations performed by the electronic device 1101 may be performed by another electronic device or a plurality of electronic devices (e.g., the electronic devices 1102 and 1104 or the server 1106). According to an embodiment, when the electronic device 1101 has to perform some functions or services automatically or in response to a request, the electronic device 1101 may request another device (e.g., the electronic device 1102 or 1104 or the server 1106) to execute at least some functions relating thereto instead of, or in addition to, autonomously performing the functions or services. Another electronic device (e.g., the electronic device 1102, the electronic device 1104, or the server 1106) may execute the requested functions or the additional functions, and may deliver a result of the execution to the electronic device 1101. The electronic device 1101 may provide the received result as it is or may additionally process the received result, so as to provide the requested functions or services. To this end, for example, cloud computing, distributed computing, or client-server computing technology may be used.

Figure 12:
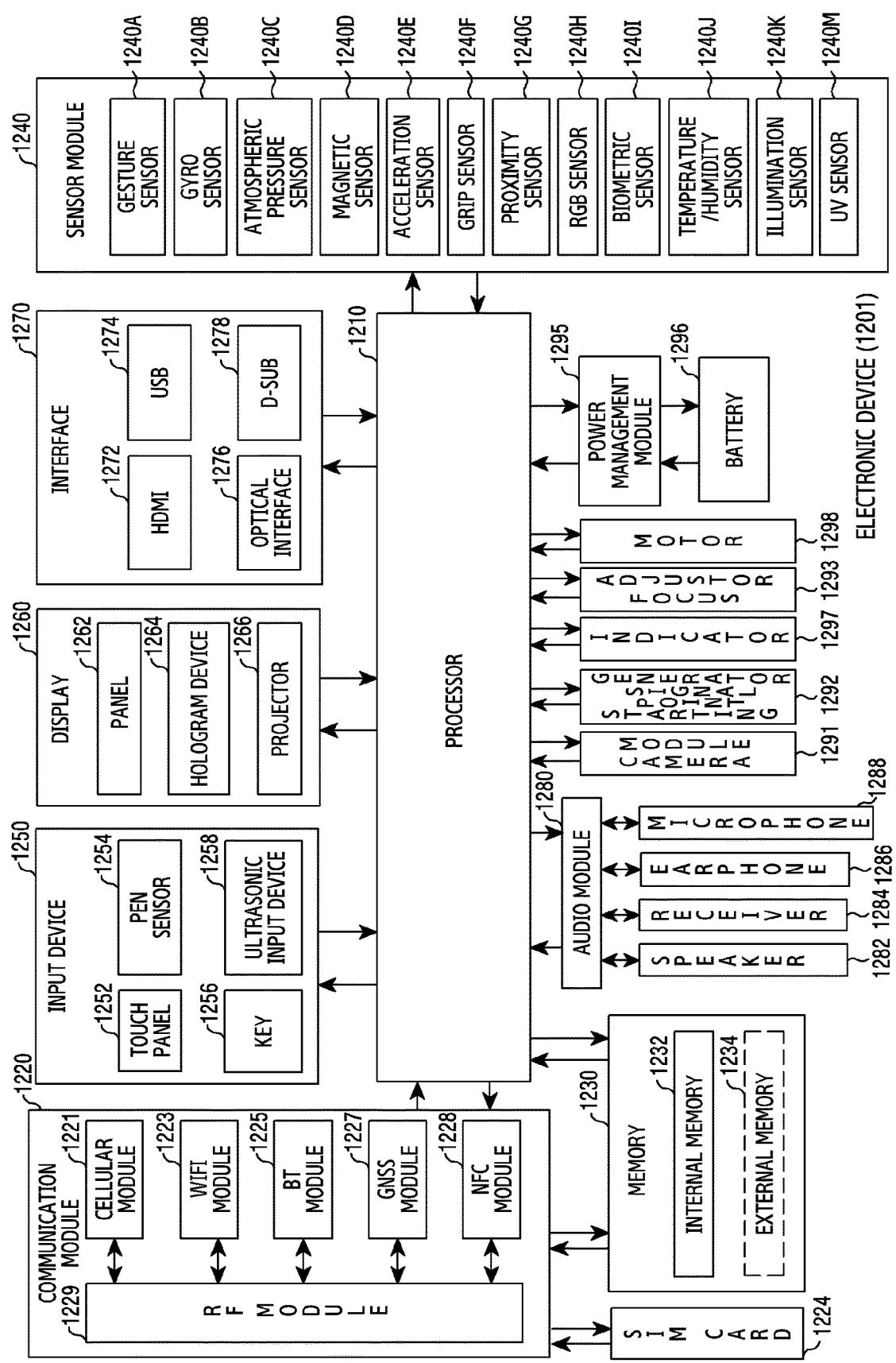
FIG. 12 is a block diagram of an electronic device according to various embodiments.

FIG. 12 is a block diagram of an electronic device according to various embodiments. For example, the electronic device 1201 may include a part or the entirety of the electronic device 1101 illustrated in FIG. 11.

Referring to FIG. 12, the electronic device 1201 may include one or more processors (e.g., AP) 1210, a communication module 1220, a subscriber identification module 1224, a memory 1230, a sensor module 1240, an input device 1250, a display 1260, an interface 1270, an audio module 1280, a camera module 1291, a power management module 1295, a battery 1296, an indicator 1297, and a motor 1298.

The processor 1210, for example, may control a plurality of hardware or software components connected to the processor 1210 by driving an operating system or an application program, and perform processing of various pieces of data and calculations. The processor 1210 may be implemented as, for example, a system on chip (SoC). According to an embodiment, the processor 1210 may further include a graphic processing unit (GPU) and/or an image signal processor. The processor 1210 may include at least some (e.g., a cellular module 1221) of the components illustrated in FIG. 12. The processor 1210 may load, in a volatile memory, instructions or data received from at least one of the other components (e.g., a non-volatile memory), process the loaded instructions or data, and store the result data in the non-volatile memory.

The communication module 1220 may have a configuration equal to, or similar to, that of the communication interface 1170 of FIG. 11. The communication module 1220 may include, for example, a cellular module 1221, a WiFi module 1223, a Bluetooth module 1225, a GNSS module 1227, an NFC module 1228, and an RF module 1229. The cellular module 1221 may provide a voice call, a video call, a text message service, or an Internet service via, for example, a communication network. According to an embodiment of the disclosure, the cellular module 1221 may identify or authenticate an electronic device 1201 in the communication network by using the subscriber identification module (e.g., a SIM card) 1224. According to an embodiment, the cellular module 1221 may perform at least some of the functions that the processor 1210 may provide. According to an embodiment, the cellular module 1221 may include a communication processor (CP). According to another embodiment, at least some (e.g., two or more) of the cellular module 1221, the WiFi module 1223, the Bluetooth module 1225, the GNSS module 1227, and the NFC module 1228 may be included in one integrated chip (IC) or IC package. The RF module 1229 may transmit/receive, for example, a communication signal (e.g., an RF signal). The RF module 1229 may include, for example, a transceiver, a power amp module (PAM), a frequency filter, a low noise amplifier (LNA), an antenna, or the like. According to another embodiment, at least one of the cellular module 1221, the WiFi module 1223, the Bluetooth module 1225, the GNSS module 1227, and the NFC module 1228 may transmit or receive an RF signal via a separate RF module. The subscriber identification module 1224 may include, for example, a card that includes a subscriber identity module and/or an embedded SIM, and may contain unique identification information (e.g., an integrated circuit card identifier (ICCID)) or subscriber information (e.g., an international mobile subscriber identity (IMSI)).

The memory 1230 (e.g., the memory 1130) may include, for example, an embedded memory 1232 or an external memory 1234. The embedded memory 1232 may include, for example, at least one of a volatile memory (e.g., a DRAM, an SRAM, an SDRAM, or the like) and a nonvolatile memory (e.g., a onetime programmable ROM (OTPROM), a PROM, an EPROM, an EEPROM, a mask ROM, a flash ROM, a flash memory, a hard disc drive, or a solid state drive (SSD)). The external memory 1234 may include a flash drive, for example, a compact flash (CF), a secure digital (SD), a Micro-SD, a Mini-SD, an eXtreme digital (xD), a multi-media card (MMC), a memory stick, and the like. The external memory 1234 may be functionally or physically connected to the electronic device 1201 through various interfaces.

The sensor module 1240 may measure a physical quantity or detect an operation state of the electronic device 1201, and may convert the measured or detected information into an electrical signal. The sensor module 1240 may include at least one of, for example, a gesture sensor 1240A, a gyro sensor 1240B, an atmospheric pressure sensor 1240C, a magnetic sensor 1240D, an acceleration sensor 1240E, a grip sensor 1240F, a proximity sensor 1240G, a color sensor 1240H (e.g., Red, Green, and Blue (RGB) sensor), a biosensor 1240I, a temperature/humidity sensor 1240J, an illumination sensor 1240K, and a Ultra Violet (UV) sensor 1240M. Additionally or alternatively, the sensor module 1240 may include, for example, an e-nose sensor, an electromyography (EMG) sensor, an electroencephalogram (EEG) sensor, an electrocardiogram (ECG) sensor, an infrared (IR) sensor, an iris sensor and/or fingerprint sensor. The sensor module 240 may further include a control circuit for controlling one or more sensors included therein. According to an embodiment, the electronic device 1201 may further include a processor configured to control the sensor module 1240, as a part of the processor 1210 or separately from the processor 1210, and may control the sensor module 1240 while the processor 210 is in a sleep state.

The input device 1250 may include, for example, a touch panel 1252, a (digital) pen sensor 1254, a key 1256, or an ultrasonic input device 1258. The touch panel 1252 may use at least one of, for example, a capacitive type, a resistive type, an infrared type, and an ultrasonic type. The touch panel 1252 may further include a control circuit. The touch panel 1252 may further include a tactile layer and provide a tactile reaction to the user. The (digital) pen sensor 1254 may include, for example, a recognition sheet that is a part of, or separate from, the touch panel. The key 1256 may include, for example, a physical button, an optical key, or a keypad. The ultrasonic input device 1258 may detect, via a microphone (e.g., the microphone 1288), ultrasonic waves generated by an input tool, and identify data corresponding to the detected ultrasonic waves.

The display 1260 (e.g., the display 1160) may include a panel 1262, a hologram device 1264, a projector 1266, and/or a control circuit for controlling them. The panel 1262 may be implemented to be, for example, flexible, transparent, or wearable. The panel 1262 may be implemented as one or more modules together with the touch panel 1252. According to an embodiment, the panel 1262 may include a pressure sensor (or a force sensor) which may measure the strength of pressure of a user touch. The pressure sensor may be implemented to be integrated with the touch panel 1252 or may be implemented as one or more sensors separate from the touch panel 1252. The hologram device 1264 may show a three dimensional image in the air by using light interference. The projector 1266 may display an image by projecting light onto a screen. The screen may be disposed, for example, inside or outside the electronic device 1201. The interface 1270 may include, for example, an HDMI 1272, a USB 1274, an optical interface 1276, or a D-subminiature (D-sub) 1278. The interface 1270 may be included in, for example, the communication interface 1170 illustrated in FIG. 11. Additionally or alternatively, the interface 1270 may, for example, include a mobile high-definition link (MHL) interface, a secure digital (SD) card/multi-media card (MMC) interface, or an infrared data association (IrDA) standard interface.

The audio module 1280 may convert, for example, sound into an electrical signal, and vice versa. At least some components of the audio module 1280 may be included in, for example, the input/output interface 1145 illustrated in FIG. 11. The audio module 1280 may process sound information input or output via, for example, a speaker 1282, a receiver 1284, earphones 1286, or the microphone 1288. The camera module 1291 is a device capable of photographing a still image and a video. According to an embodiment, the camera module 291 may include one or more image sensors (e.g., a front sensor or a rear sensor), a lens, an image signal processor (ISP), or a flash (e.g., an LED or xenon lamp). The power management module 1295 may manage, for example, power of the electronic device 1201. According to an embodiment, the power management module 1295 may include a power management integrated circuit (PMIC), a charger IC, or a battery or fuel gauge. The PMIC may use a wired and/or wireless charging method. The wireless charging method may include, for example, a magnetic resonance method, a magnetic induction method, an electromagnetic wave method, and the like. Additional circuits (e.g., a coil loop, a resonance circuit, a rectifier, and the like) for wireless charging may be further included. The battery gauge may measure, for example, the amount of charge remaining in the battery 1296, and a voltage, a current, or a temperature while charging. The battery 1296 may include, for example, a rechargeable battery or a solar battery.

The indicator 1297 may display a particular state (e.g., a booting state, a message state, a charging state, or the like) of the electronic device 1201 or a part (e.g., the processor 1210) of the electronic device 1201. The motor 1298 may convert an electrical signal into a mechanical vibration and may generate a vibration, a haptic effect, or the like. The electronic device 1201 may include a mobile TV support device that can process media data according to the standard, such as digital multimedia broadcasting (DMB), digital video broadcasting (DVB), mediaFlo™, and the like. Each of the above-described elements described in the disclosure may be include one or more components, and the names of the corresponding elements may vary depending on the type of electronic device. In various embodiments, an electronic device (e.g., the electronic device 201) may omit some elements or may further include additional elements, or some of the elements of the electronic device may be combined with each other to configure one entity, which may perform the same functions of the corresponding elements prior to the combination.

Figure 13:
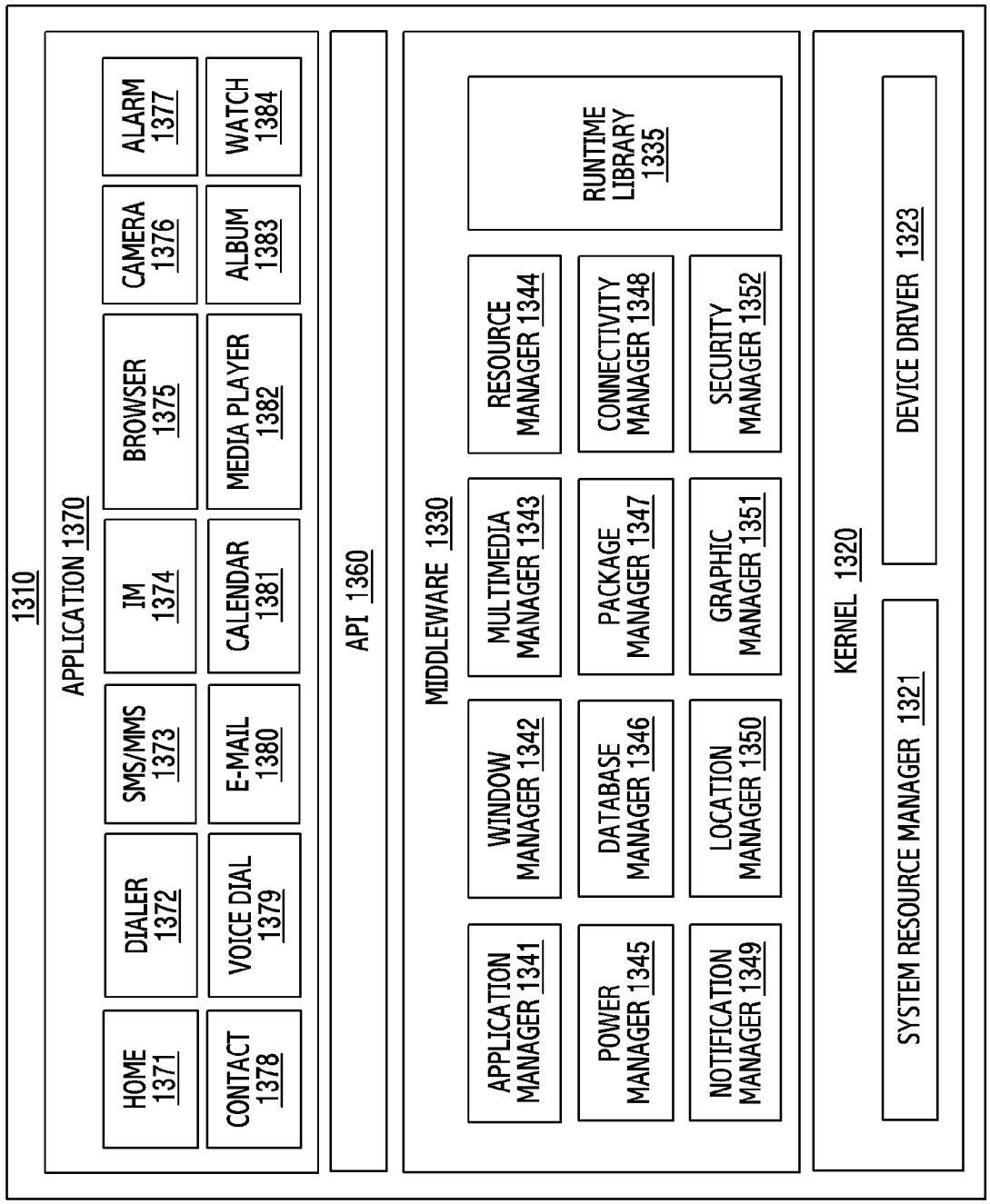
FIG. 13 is a block diagram of a programming module according to various embodiments.

FIG. 13 is a block diagram of a programming module according to various embodiments. According to an embodiment, the program module 1310 (e.g., the program 1140) may include an operating system (OS) that controls resources relating to an electronic device (e.g., the electronic device 1101) and/or various applications (e.g., the application programs 1147) that are driven on the operating system. The operating system may include, for example, Android™, iOS™, Windows™, Symbian™, Tizen™, or Bada™.

Referring to FIG. 13, the program module 1310 may include a kernel 1320 (e.g., the kernel 1141), middleware 1330 (e.g., the middleware 1143), an API 1360 (e.g., the API 1145), and/or applications 1370 (e.g., the application programs 1147). At least a part of the program module 1310 may be preloaded on an electronic device, or may be downloaded from an external electronic device (e.g., the electronic device 1102 or 1104 or the server 1106).

The kernel 1320 may include, for example, a system resource manager 1321 and/or a device driver 1323. The system resource manager 1321 may control, allocate, or retrieve system resources. According to an embodiment, the system resource manager 1321 may include a process manager, a memory manager, or a file system manager. The device driver 1323 may include, for example, a display driver, a camera driver, a Bluetooth driver, a shared memory driver, a USB driver, a keypad driver, a WiFi driver, an audio driver, or an inter-process communication (IPC) driver. For example, the middleware 1330 may provide a function required in common by the applications 1370, or may provide various functions to the applications 1370 via the API 1360 so as to enable the applications 1370 to efficiently use the limited system resources in the electronic device. According to an embodiment, the middleware 1330 may include at least one of a runtime library 1335, an application manager 1341, a window manager 1342, a multi-media manager 1343, a resource manager 1344, a power manager 1345, a database manager 1346, a package manager 1347, a connectivity manager 1348, a notification manager 1349, a location manager 1350, a graphic manager 1351, or a security manager 1352.

The runtime library 1335 may include a library module that a compiler uses in order to add a new function via a programming language while an application 1370 is running. The runtime library 1335 may perform input/output management, may manage a memory, or process an arithmetic function. The application manager 1341 may manage, for example, the life cycle of the application 1370. The window manager 1342 may manage GUI resources used for a screen. The multimedia manager 1343 may identify formats required for reproducing various media files and may encode or decode a media file using a codec suitable for a corresponding format. The resource manager 1344 may manage the source code of the applications 1370 or the space in memory. The power manager 1345 may manage, for example, the capacity or power of a battery and may provide power information required for operating the electronic device. According to an embodiment, the power manager 345 may interoperate with a basic input/output system (BIOS). The database manager 1346 may, for example, generate, search, or change databases to be used by the applications 1370. The package manager 1347 may manage installation or updating of an application distributed in the form of a package file.

The connectivity manager 1348 may manage, for example, wireless connection. The notification manager 1349 may provide an event (e.g., an arrival message, an appointment, a proximity notification, or the like) to a user. The location manager 1350 may manage, for example, the location information of the electronic device. The graphic manager 1351 may manage a graphic effect to be provided to a user and a user interface relating to the graphic effect. The security manager 1352 may provide, for example, system security or user authentication. According to an embodiment, the middleware 1330 may include a telephony manager for managing a voice or video call function of the electronic device or a middleware module that is capable of making a combination of the functions of the above-described elements. According to an embodiment, the middleware 1330 may provide specialized modules according to the types of operation systems. Also, the middleware 1330 may dynamically delete some of the existing elements, or may add new elements. The API 1360 is, for example, a set of API programming functions, and may be provided with different configurations depending on the operating system. For example, in the case of Android or iOS, one API set may be provided for each platform, and in the case of Tizen, two or more API sets may be provided for each platform.

The applications 1370 may include applications, for example, a home 1371, a dialer 1372, an SMS/MMS application 1373, an instant message (IM) application 1374, a browser 1375, a camera 1376, an alarm 1377, contacts 1378, a voice dialer 1379, an e-mail 1380, a calendar 1381, a media player 1382, an album 1383, a watch 1384, a healthcare application (e.g., measuring exercise quantity or blood glucose), an environment information (e.g., atmospheric pressure, humidity, or temperature information) application, and the like. According to an embodiment, the applications 1370 may include an information exchange application that can support exchanging of information between the electronic device and an external electronic device. The information exchange application may include, for example, a notification relay application for relaying particular information to an external electronic device or a device management application for managing an external electronic device. For example, the notification relay application may relay notification information generated in the other applications of the electronic device to an external electronic device, or may receive notification information from an external electronic device to provide the received notification information to a user. The device management application may install, delete, or update functions of an external electronic device that communicates with the electronic device (e.g., turning on/off the external electronic device itself (or some elements thereof) or adjusting the brightness (or resolution) of a display) or applications executed in the external electronic device. According to an embodiment, the applications 1370 may include applications (e.g., a health care application of a mobile medical appliance) that are designated according to the attributes of an external electronic device. According to an embodiment, the applications 1370 may include applications received from an external electronic device. At least some of the program module 1310 may be implemented (e.g., executed) as software, firmware, hardware (e.g., the processor 1210), or a combination of two or more thereof and may include a module, a program, a routine, an instruction set, or a process for performing one or more functions.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 1130) in the form of a program module. The instruction, when executed by a processor (e.g., the processor 1120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter. The programming module according to the disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

As described above, an electronic device that provides a user interface (UI) is provided, the electronic device including: a display configured to display a UI; and a processor coupled with the display, and the processor is configured to: display a UI including an object which has a first size and is used for executing at least one function of an application running in the electronic device; detect movement of the electronic device on the basis of data obtained via a sensor of the electronic device; and display a UI including the object, of which the size is changed from the first size to a second size in the UI, on the basis of the detected movement and information indicating the input frequency of a user input detected from the object.

According to an embodiment, the processor is further configured to: determine the input frequency value of a user input detected within a region of the object; and store, in the electronic device, heatmap information associated with the object generated on the basis of the determined input frequency value. According to another embodiment, the processor is further configured to: identify whether the input frequency value of the object is greater than or equal to a predetermined reference frequency value; and when the input frequency value of the object is greater than or equal to the predetermined reference frequency value, display a UI including the object of which the size is changed from the first size to the second size.

According to another embodiment, the processor is further configured to: determine a level corresponding to the input frequency value of the first object; and display a UI including the object of which the size is changed from the first size to the second size or a third size according to the level of the object, wherein the third size is greater than the second size, and the second size is greater than the first size.

According to another embodiment, the processor is further configured to: determine a user input detected beyond the region of the object, to be an incorrect input; determine the frequency value associated with the incorrect input; and display a UI including the object, of which the shape is changed in the UI on the basis of the incorrect input, on the basis of the detected movement and the frequency value of the incorrect input.

According to another embodiment, the processor is further configured to display a UI including the object of which the size is changed from the first size to the second size on the basis of the detected movement and information stored in advance in the electronic device, wherein the information stored in advance includes at least one of size enlargement information set in advance in the electronic device, and information associated with an age, gender, and eyesight of a user of the electronic device.

According to another embodiment, the processor is configured to: obtain a facial image of the user using an image sensor included in the electronic device when the eyesight of the user of the electronic device is less than a predetermined eyesight reference value; identify whether the user wears glasses on the basis of the obtained facial image; and display a UI including the object of which the size is changed from the first size to the second size when it is identified that the user does not wear glasses.

According to another embodiment, the processor is further configured to: measure a speed at which the electronic device moves using a sensor included in the electronic device; determine that the electronic device is in the normal mode when the measured speed is less than a predetermined first speed threshold value, determine that the electronic device is in the walking mode when the measured speed is greater than or equal to the first speed threshold value and less than a predetermined second speed threshold value, and determine that the electronic device is the running mode when the measured speed is greater than the second speed threshold value; display a UI including the object of which the size is changed from the first size to the second size when the electronic device is in the walking mode; and display a UI including the object, of which the size is changed from the first size to a third size in the UI, when the electronic device is the running mode, wherein the third size is greater than the second size, and the second size is greater than the first size.

According to another embodiment, the processor is further configured to identify that the electronic device enters a vehicle. The processor is configured to further perform: receiving a beacon signal of a beacon installed in the vehicle, and identifying that the electronic device enters the vehicle; and performing near-field communication with a vehicle system installed in the vehicle, and identifying that the electronic device enters the vehicle.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

The embodiments disclosed in the specifications and drawings are provided merely to readily describe and to help a thorough understanding of the disclosure but are not intended to limit the scope of the disclosure. Therefore, it should be construed that, in addition to the embodiments disclosed herein, all modifications and changes or modified and changed forms derived from the technical idea of the disclosure fall within the scope of the disclosure.

The invention claimed is:

1. An electronic device, comprising:
a display configured to display a user interface (UI); and
a processor coupled with the display,
wherein the processor is configured to:
display, in the UI, an object which has a first size and is used for executing at least one function of an application running in the electronic device;
detect a movement of the electronic device based on data obtained via a sensor of the electronic device;
determine a frequency value associated with an incorrect input which is a user input detected beyond a region of the object; and
display, in the UI, the object of which a size is changed from the first size to a second size, based on the detected movement, the frequency value associated with the incorrect input, and information indicating an input frequency of a user input detected from the object.

2. The electronic device of claim 1, wherein the processor is further configured to:
determine an input frequency value of a user input detected within the region of the object; and
store heatmap information associated with an input frequency related to the object, based on the determined input frequency value.

3. The electronic device of claim 2, wherein the processor is further configured to:
identify whether the input frequency value of the object is greater than or equal to a predetermined reference frequency value; and
when the input frequency value of the object is greater than or equal to the predetermined reference frequency value, display, in the UI, the object of which the size is changed from the first size to the second size.

4. The electronic device of claim 2, wherein the processor is further configured to:
determine a level corresponding to the input frequency value of the object; and
display, in the UI, the object of which the size is changed from the first size to the second size or a third size according to the level of the object,
wherein the third size is greater than the second size, and the second size is greater than the first size.

5. The electronic device of claim 1, wherein the processor is further configured to:
display, in the UI, the object of which a shape is changed in the UI based on the incorrect input, based on the detected movement and the frequency value associated with the incorrect input.

6. The electronic device of in claim 1, wherein the processor is further configured to display, in the UI, the object of which the size is changed from the first size to the second size based on the detected movement and information stored in advance in the electronic device,
wherein the information stored in advance comprises at least one of size enlargement information set in advance in the electronic device, and information associated with an eyesight of a user of the electronic device, and medical history of the user of the electronic device.

7. The electronic device of claim 6, wherein the processor is configured to:
obtain a facial image of the user using an image sensor included in the electronic device when the eyesight of the user of the electronic device is less than a predetermined eyesight reference value;
identify whether the user wears glasses based on the obtained facial image; and
display, in the UI, the object of which the size is changed from the first size to the second size when it is identified that the user does not wear glasses.

8. The electronic device of claim 1, wherein the processor is further configured to:
measure a speed at which the electronic device moves using a sensor included in the electronic device;
determine that the electronic device is in a normal mode when the measured speed is less than a predetermined first speed threshold value, determine that the electronic device is in a walking mode when the measured speed is greater than or equal to the first speed threshold value and less than a predetermined second speed threshold value, and determine that the electronic device is a running mode when the measured speed is greater than the second speed threshold value;
display, in the UI, the object of which the size is changed from the first size to the second size when the electronic device is in the walking mode; and
display, in the UI, the object of which the size is changed from the first size to a third size when the electronic device is the running mode,
wherein the third size is greater than the second size, and the second size is greater than the first size.

9. The electronic device of claim 1, wherein the processor is further configured to identify that the electronic device enters a vehicle.

10. The electronic device of claim 9, wherein the processor is configured to further perform:
receiving a beacon signal of a beacon installed in the vehicle, and identifying that the electronic device enters the vehicle; and
performing near-field communication with a vehicle system installed in the vehicle, and identifying that the electronic device enters the vehicle.

11. A method of operating an electronic device, comprising:
displaying a user interface (UI) including an object which has a first size and is used for executing at least one function of an application running in the electronic device;
detecting a movement of the electronic device based on data obtained via a sensor of the electronic device;
determining a frequency value associated with an incorrect input which is a user input detected beyond a region of the object; and
displaying, in the UI, the object of which a size is changed from the first size to a second size, based on the detected movement, the frequency value associated with the incorrect input, and information indicating an input frequency of a user input detected from the object.

12. The method as claimed in claim 11, wherein the displaying, in the UI, the object of which the size is changed from the first size to the second size, further comprises:
   identifying whether an input frequency value of the object is greater than or equal to a predetermined reference frequency value; and
   when the input frequency value of the object is greater than or equal to the predetermined reference frequency value, displaying, in the UI, the object of which the size is changed from the first size to the second size.

13. The method of claim 12, wherein the displaying the UI including the object of which the size is changed from the first size to the second size comprises:
   determining a level corresponding to the input frequency value of the object; and
   displaying the UI including the object of which the size is changed from the first size to the second size or a third size according to the level of the object,
   wherein the third size is greater than the second size, and the second size is greater than the first size.

14. The method of claim 11, further comprising:
   determining a user input detected beyond the region of the object, to be the incorrect input; and
   storing heatmap information associated with the incorrect input in the electronic device,
   wherein the displaying the UI including the object of which the size is changed from the first size to the second size further comprises displaying the UI including the object of which a shape is changed based on the incorrect input, based on the detected movement and the frequency value of the incorrect input.

15. The method of in claim 11, further comprising:
   displaying the UI including the object of which the size is changed from the first size to the second size in the UI based on the detected movement and information stored in advance in the electronic device,
   wherein the information stored in advance comprises at least one from among size enlargement information set in advance in the electronic device, and information associated with an eyesight of a user of the electronic device, and medical history of the user of the electronic device.

* * * * *